(12) United States Patent
Pulito et al.

(10) Patent No.: US 7,313,593 B1
(45) Date of Patent: Dec. 25, 2007

(54) METHOD AND APPARATUS FOR PROVIDING FULL DUPLEX AND MULTIPOINT IP AUDIO STREAMING

(75) Inventors: Brian Pulito, Lexington, KY (US); Mark Johnson, Cincinnati, OH (US); Brian Cline, Hebron, KY (US); Jeff Durham, West Chester, OH (US); Mark Kressin, Lakeway, TX (US); Andrew Lochbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 09/695,193

(22) Filed: Oct. 24, 2000

(51) Int. Cl.
*G06F 15/16* (2006.01)

(52) U.S. Cl. ............... 709/204; 709/227; 709/231; 709/246; 370/260

(58) Field of Classification Search ............ 709/204, 709/205, 227, 231, 246, 248; 370/260
See application file for complete search history.

(56) References Cited

U.S. PATENT DOCUMENTS

| | | | |
|---|---|---|---|
| 4,998,243 A | 3/1991 | Kao | |
| 5,392,400 A | 2/1995 | Berkowitz et al. | |
| 5,511,199 A | 4/1996 | Anthias et al. | |
| 5,533,112 A | 7/1996 | Danneels | |
| 5,539,741 A | 7/1996 | Barraclough et al. | |
| 5,675,374 A * | 10/1997 | Kohda | 348/14.1 |
| 5,734,724 A | 3/1998 | Kinoshita et al. | |
| 5,748,894 A | 5/1998 | Ishizaki et al. | |
| 5,781,732 A | 7/1998 | Adams | |
| 5,822,585 A | 10/1998 | Noble et al. | |
| 5,862,329 A | 1/1999 | Aras et al. | |
| 5,867,653 A | 2/1999 | Aras et al. | |
| 5,890,162 A | 3/1999 | Huckins | |
| 5,953,049 A | 9/1999 | Horn et al. | |
| 6,020,915 A * | 2/2000 | Bruno et al. | 348/14.09 |
| 6,049,565 A | 4/2000 | Paradine et al. | |
| 6,148,068 A | 11/2000 | Lowery et al. | |
| 6,240,070 B1 * | 5/2001 | Kozdon et al. | 370/260 |
| 6,334,141 B1 * | 12/2001 | Varma et al. | 709/205 |
| 6,343,313 B1 | 1/2002 | Salesky et al. | |
| 6,356,294 B1 | 3/2002 | Martin et al. | |

(Continued)

OTHER PUBLICATIONS

Schulzrinne et al., "RTP: A Transport Protocol for Real-Time Applications", RFC 3550, Jul. 2003, section 2. pp. 6-8.*

*Primary Examiner*—Oanh Duong
(74) *Attorney, Agent, or Firm*—McGuinness & Manaras LLP

(57) ABSTRACT

A conference server enables collaborative communications among a variety of client processes of varying configurations all operatively coupled over a computer network to each other and to the server. The server receives audio streams from participating client processes in a conference, selects which audio streams are active, and broadcasts one or more of the active audio streams to the client processes participating in the conference depending on the clients receiving capabilities and the conference parameters. The client processes receiving multiple active audio streams perform mixing locally at the client node. Without having to perform mixing at the server, resources are saved and the number of simultaneous participating client processes to the conference may be increased accordingly. The server is further capable of simultaneously accommodating multipoint clients and non-multipoint H.323 clients, as well as operating in multiway and "push to talk" modes.

13 Claims, 12 Drawing Sheets

U.S. PATENT DOCUMENTS

| | | |
|---|---|---|
| 6,359,882 B1 * | 3/2002 | Robles et al. ............... 370/389 |
| 6,418,125 B1 * | 7/2002 | Oran .......................... 370/266 |
| 6,421,726 B1 | 7/2002 | Kenner et al. |
| 6,453,336 B1 * | 9/2002 | Beyda et al. ............... 709/204 |
| 6,453,355 B1 * | 9/2002 | Jones et al. ................ 709/230 |
| 6,457,043 B1 * | 9/2002 | Kwak et al. ................ 709/204 |
| 6,466,550 B1 * | 10/2002 | Foster et al. ............... 370/261 |
| 6,466,585 B1 * | 10/2002 | Le ............................. 370/465 |
| 6,473,858 B1 * | 10/2002 | Shimomura et al. ........ 713/150 |
| 6,496,201 B1 | 12/2002 | Baldwin et al. |
| 6,538,989 B1 | 3/2003 | Carter et al. |
| 6,570,926 B1 * | 5/2003 | Agrawal et al. ....... 375/240.27 |
| 6,587,870 B2 | 7/2003 | Takagi et al. |
| 6,598,172 B1 * | 7/2003 | VanDeusen et al. ........ 713/503 |
| 6,646,997 B1 | 11/2003 | Baxley et al. |
| 6,647,389 B1 | 11/2003 | Fitch et al. |
| 6,657,975 B1 | 12/2003 | Baxley et al. |
| 6,683,858 B1 * | 1/2004 | Chu et al. ................... 370/263 |
| 6,714,826 B1 * | 3/2004 | Curley et al. ............... 725/131 |
| 6,804,254 B1 * | 10/2004 | Pearce et al. ............... 370/467 |

* cited by examiner

METHOD AND APPARATUS FOR PROVIDING FULL DUPLEX AND MULTIPOINT IP AUDIO STREAMING

RELATED APPLICATIONS

This application is one of three related applications filed on an even date herewith and commonly assigned, the subject matters of which are incorporated herein by reference for all purposes, including the following:

U.S. patent application Ser. No. 09/695,203, entitled "Method and Apparatus for Two-Way Distributed Audio Mixing of Multi-way Calls"; and U.S. patent application Ser. No. 09/695,553, entitled "Method and Apparatus for Multi-Mode IP Audio Streaming".

FIELD OF THE INVENTION

The invention relates, generally, to data processing systems and, more specifically, to a technique for enabling collaborative communications over packet-switched communications networks.

BACKGROUND OF THE INVENTION

Systems for telephone conferencing over circuit-switched networks, such as traditional public switched telephone networks, are currently in widespread use. Such systems typically use a PSTN audio bridge which allows all participants to a conference call to hear all other participants. Such systems typically generate long-distance telephone fees, and are not able to integrate with video and data with the audio conference.

More recently, systems for enabling audio and/or video conferencing of multiple parties over packet-switched networks, such as the Internet, have become commercially available. Such systems typically allow participants to simultaneously receive and transmit audio and/or video data streams depending on the sophistication of the system. Conferencing systems used over packet-switched networks have the advantage of not generating long-distance telephone fees and enable varying levels of audio, video, and data integration into the conference forum. In a typical system, a conference server receives audio and/or video streams from the participating client processes to the conference, mixes the streams and retransmits the mixed stream to the participating client processes. Such systems provide good audio quality but require considerable dedicated hardware. In such an implementation, each active audio stream from a conference participant must be decompressed, mixed with other audio streams and the mixed audio stream encoded prior to being sent to all participants in the conference. Accordingly, such systems do not scale well due to the costs of the dedicated processing power required for each active audio stream to the conference. A further disadvantage of such systems is that, depending on the compression/decompression (codec) algorithm, much processing power can be expended encoding/decoding and remixing non-active audio data, i.e., silence.

Certain Internet telephone software available today requires participants to a conference to "push" or activate a button on the graphic user interface of the software before speaking, similar to conventional microwave devices such as CB radios. Activation of such a button notifies the conference server that the participant is transmitting an active audio stream. This type of notification scheme is a step backward from current Public Switched Telephone Network conference bridges which allow people to converse in a natural manner.

Still other conference servers transmit only a single audio stream which is considered to be currently active. This technique provides half duplex multi-way audio calling at best. Unfortunately, clipping of the audio stream occurs when the conference server switches between participants, making it difficult to provide a natural multi-way call in which participants may interact, e.g. interrupt each other.

Accordingly, a need exists for a conferencing system in a packet-switched network environment which enables audio and/or video conferencing among participating callers at multiple end points and which is both scalable and does not have cost-prohibitive hardware requirements.

A further need exists for a conferencing system in a packet-switched network environment which enables audio and/or video conferencing among participating callers at multiple end points and which allows participants to interact naturally without requiring activation of the audio stream to speak or which results in audio clipping when switching between participants.

A further need exists for a conferencing system in a packet-switched network environment which enables audio and/or video conferencing among participating callers at multiple end points and which enables the conference server to be implemented in all software.

SUMMARY OF THE INVENTION

According to the present invention, a server process enables collaborative communications among client processes operatively coupled over a computer network to each other and to the server. The inventive server application receives audio streams from participating client process to the conference, selects which audio streams are active, transmits multiple of the active audio streams to the participating client processes to the conference. The participating client processes are required to perform mixing of the active audio streams locally, in a distributed manner. As such, without having to perform mixing at the server, CPU resources are saved and the number of simultaneous participating client processes to the conference may be increased accordingly.

The server application comprises a Multimedia Control Unit (MMCU) component and a Multimedia Processor (MMP) component that provide multipoint audio and video services for the server application enabling client processes to participate in real-time collaborations or meetings that include audio and video content. The MMCU/MMP components of the server use a switching technique to create a multipoint audio and video experience for the client processes. Specifically, the MMCU/MMP monitors inbound audio packets from all client processes. Once non-silence audio packets are received, the MMCU/MMP locks onto that audio stream from that client process and broadcast these packets to other client processes in the "meeting". After the client process sourcing the packets has gone "silent" for a threshold period of time, the MMCU/MMP identifies other active audio client processes. The MMCU/MMP can lock onto multiple audio input streams. Client processes capable of receiving more than one audio stream will receive multiple audio streams. Client processes receiving multiple audio streams are expected to mix the streams before playback to the listener. Client processes which are unable to receive multiple streams receive only receive one of the multiple streams.

Data streamed between the server and the client processes may use the Real-Time Protocol (RTP), an industry standard protocol for real-time transmission of packets containing data such as audio or video. In accordance with real-time protocol, packets of data are presented in a predetermined sequence, regardless of the order in which the packers were received. Each RTP packet has a sequence number as part of the RTP packet header. The purpose of the sequence number is so that the client process receiving the packets knows the proper order in which to play back the packets. Because the MMCU/MMP may switch between many different client processes during the course of a conference, the MMCU/MMP ensures that sequence numbers remain consistent for a receiving client process that does not support multipoint by maintaining the last sequence number sent to each client process and the last received packet number from each client process. Like the sequence numbers, each RTP packet header includes a timestamp. The client process places this timestamp in the packet header. The receiving client process uses the timestamp to determine the proper time to play back the packet. As with sequence numbers, the server maintains the outbound timestamp. When the MMCU/MMP switches to another inbound stream, the MMCU/MMP will store the value of the current server time. Then, as each new inbound packet is sent to the outbound client processes, the value of the stored server time will be incremented by the difference (either positive or negative depending if packets are received out of order) of the current and last received packet of the inbound client process. This server time value will be used for all outbound clients that do not support multipoint, i.e. unlike the sequence numbers, all outbound packets contain the same timestamp value and are based upon the server time.

Like the sequence numbers, each RTP packet header includes a sequence source identifier. The client process places this sequence source identifier in the packet header. Client processes adhering to the H.323 protocol require special consideration in the present invention. Specifically, a non-mulitpoint H.323 client can only conduct communications with another H.323 client. Accordingly, the continual switching among audio data streams from other client processes participating in the conference presents a problem for these types of H.323 clients. The present invention overcomes this limitation by manipulating the sequence source identifier (SSRC) in the RTP packet header prior to transmitting outbound packet streams to an H.323 client. For example, the server 300, specifically the MMP 304, replaces the SSRC value in the packet header of each packet with its own SSRC information prior to transmitting the packet stream to the H.323 client process. As a result, the H.323 client process is spoofed into believing it is communicating with a single H.323 client, instead of the conference server which is selectively multiplexing audio streams from multiple participating client processes in the conference.

According to a first aspect of the invention, in a server process executing at a node on a computer network and operatively coupled over the computer network to one or more client processes, selected of the client processes capable of transmitting a stream of audio packets to the server process, each packet having a packet header including a time stamp, source identifier and sequence number associated with that packet, a method for enabling audio conferencing comprises: (a) establishing a point-to-point communication connection with a plurality of the client processes; (b) identifying at least a first of the selected client processes which is transmitting a stream of active audio packets; (c) modifying one of the time stamp and sequence number associated with the packets in the stream of active audio packets; and (d) retransmitting the modified packets of the stream of active audio from the first identified client process to others of the plurality of client processes.

According to a second aspect of the invention, a computer program product for use with a server apparatus operatively coupled to one or more client processes over a computer network, selected of the client processes capable of transmitting a stream of audio packets to the server apparatus, each packet having a packet header including a time stamp, source identifier and sequence number associated with the packet, comprises a computer useable medium having embodied therein program code comprising: (a) program code for establishing a point-to-point communication connection with a plurality of the client processes; (b) program code for identifying at least a first of the selected client processes which is transmitting a stream of active audio packets; (c) program code for modifying one of the time stamp and sequence number associated with the packets in the stream of active audio packets; and (d) program code for retransmitting the modified packets of the stream of active audio from the first identified client process to others of the plurality of client processes.

According to a third aspect of the invention, an apparatus for use with a computer system operatively coupled over a computer network to one or more client processes, selected of the client processes capable of transmitting a stream of audio packets to the computer system, each packet having a packet header including a time stamp, source identifier and sequence number associated with the packet, comprises: (a) program logic configured to establish a point-to-point communication connection between the computer system and a plurality of client processes; (b) program logic configured to identify at least a first of the selected client processes which is transmitting a stream of active audio packets; (c) program logic configured to modify one of the time stamp and sequence number associated with the packets in the stream of active audio packets; and (d) program logic configured to retransmit the modified packets of the stream of active audio from the first identified client process to others of the plurality of client processes.

According to a fourth aspect of the invention, a computer data signal embodied in a carrier wave comprises: (a) program code for establishing a point-to-point communication connection between a server process and selected of a plurality of client processes, selected of the client processes capable of transmitting a stream of audio packets to the server apparatus, each packet having a packet header including a time stamp, source identifier and sequence number associated with the packet; (b) program code for identifying at least a first of the selected client processes which is transmitting a stream of active audio packets; (c) program code for modifying one of the time stamp and sequence number associated with the packets in the stream of active audio packets; and (d) program code for retransmitting the modified packets of the stream of active audio from the first identified client process to others of the plurality of client processes.

According to a fourth aspect of the invention, a system for enable conferencing over a computer network comprises (a) a plurality of client process operatively coupled to the computer network and configured to establish a point-to-point communication connection with an other process operatively coupled to the computer network, each of the plurality of client processes configured to receive at least one active stream of audio data, selected of the plurality of client processes are configured to transmit an active stream of audio data; and (b) a server process operatively coupled to the computer network and configured to identify a first of the selected plurality of client processes which is transmitting an active audio stream and to retransmit the active audio stream of the first identified client process to others of the plurality of client processes in unmixed form.

BRIEF DESCRIPTION OF THE DRAWINGS

The above and other features, objects, and advantages of the invention will be better understood by referring to the following description in conjunction with the accompanying drawing in which.

DETAILED DESCRIPTION

Figure 1:
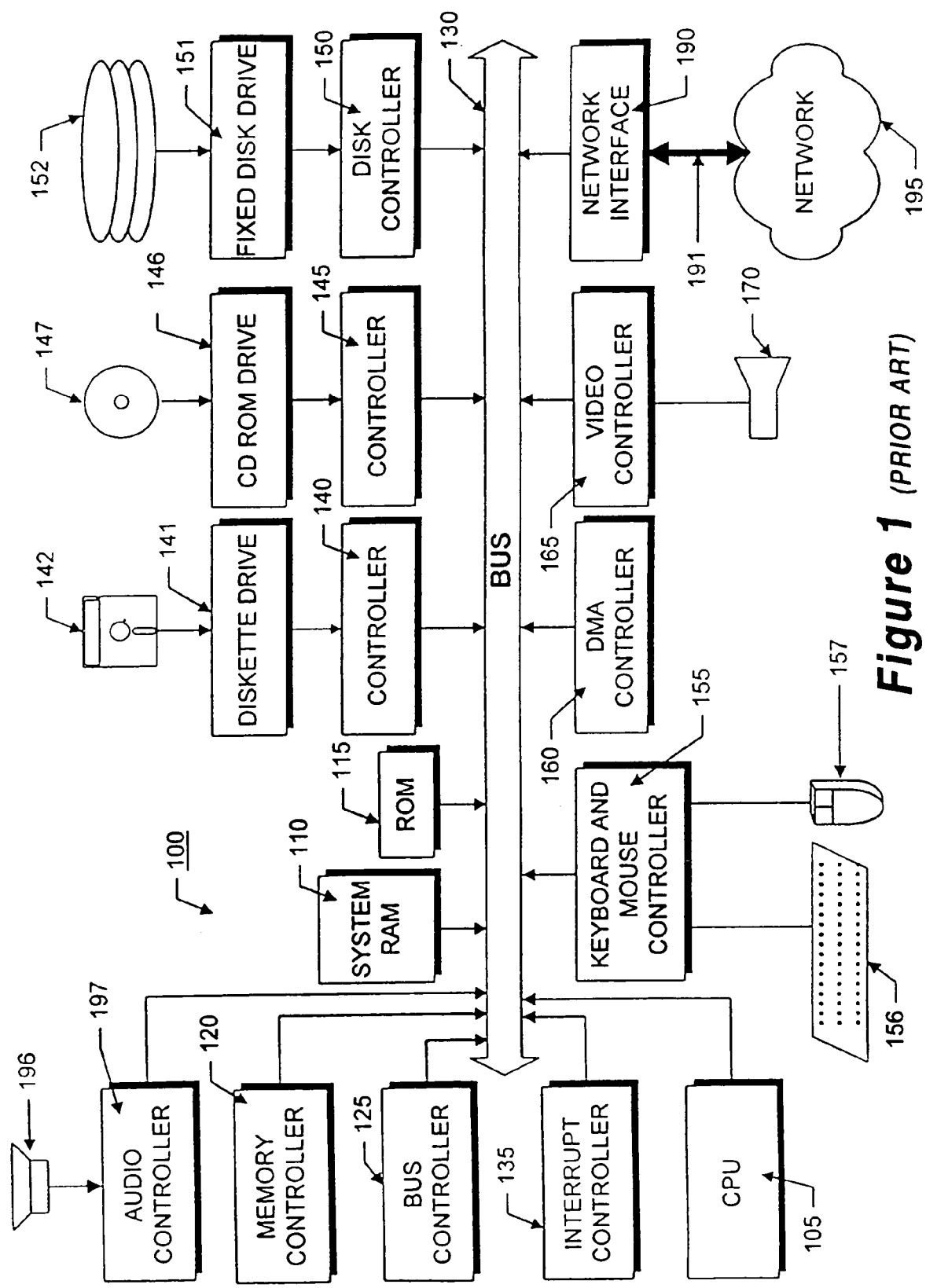
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including OS/2, UNIX and DOS, etc. One or more applications 202 such as Lotus Notes or Lotus Sametime, both commercially available from Lotus Development Corp., Cambridge, Mass. If operating system 200 is a true multitasking operating system, multiple applications may execute simultaneously.

In the illustrative embodiment, the server and client in accordance with the present invention may be implemented using object-oriented technology and an operating system which supports an execution of an object-oriented programs. For example, the inventive servers may be implemented using the C++ language or as well as other object-oriented standards, including the COM specification and OLE 2.0 specification for Microsoft Corporation, Redmond, Wash., or, the Java programming environment from Sun Microsystems, Redwood, Calif.

In the illustrative embodiment, the elements of the system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Object-oriented technology forms the basis for component technology. For the purpose of this disclosure, components are essentially C++ objects that conform an object model, such as Microsoft's Component Object Module. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most object-oriented and object-based languages, including C++, do not specify true object modules, but merely specify syntax and semantics of a basic object implementation without specifying the rules that unify object systems.

Network Environment/Standards

To better understand the network environment in which the invention may be implemented a brief description current standards and protocol is provided for the reader's benefit.

The need for Internet communication and collaboration products to seamlessly work with each other led to the creation of the H.323 standard for Internet protocol (IP) audio and video over the Internet. As with any standard, however, H.323 does not provide solutions for all types of environments where IP audio and video can be used. A competing standard, Session Initiation Protocol (SIP), is gaining market acceptance and will most likely be adopted and deployed in the coming years. While the invention is intended to be interoperable with the H.323 standard, other standards and emerging protocols may also be used to implement the inventive concepts set forth herein.

H.323 is an umbrella recommendation from the International Telecommunications Union (ITU) that sets standards for multimedia communications over local-area networks (LANs) that do not provide a guaranteed Quality of Service (QoS). The standard is broad in scope and includes both stand-alone devices and embedded personal computer technology as well as point-to-point and multipoint conferences. The H.323 standard addresses call control, multimedia management, and bandwidth management for point-to-point and multipoint conferences. H.323 also addresses interfaces between LANs and other networks.

The H.323 standard defines four major components for a network-based communication system: Terminals, Gateways, Gatekeepers, and Multipoint Control Units (MCUs). Terminals are the client endpoints on the LAN, which provide for real-time, two-way communications. Clients are not necessarily software endpoints running on a desktop PC. Although these types of clients are important and perhaps the best known, other clients, such as Gateways, Gatekeepers, and MCUs, play a more crucial role in the overall architecture. Gateways are an optional component in an H.323 network. A gateway is responsible for many things, including a translation function between H.323 conferencing endpoints and other ITU-compliant terminals. The primary function of the Gateway is to reflect the characteristics of a LAN endpoint to a Switched Circuit Network (SCN) endpoint, and vice versa. Primarily, Gateways are used to: i) establish links with analog Public Switched Telephone Network (PSTN) terminals; ii) establish links with remote H.320-compliant terminals over ISDN-based switched circuit networks; and iii) establish links with remote H.324-compliant terminals over PSTN networks. Unlike a Gateway, a Gatekeeper provides services such as address translation and bandwidth management. Address translation is used to resolve LAN aliases for terminals and Gateways to IP or IPX addresses. This allows endpoints to advertise themselves using e-mail addresses, phone numbers, and the like. The second function provided by the Gatekeeper is bandwidth management. For instance, if a network manager has specified a threshold for the number of simultaneous conferences on the LAN, the Gatekeeper can refuse to make any more connections once the threshold is reached. The effect is to limit the total conferencing bandwidth to some fraction of the total available. The remaining capacity is left for other mission critical applications such as e-mail, file transfers, and other LAN protocols. For more information on the H.323 protocol, the reader may review the actual published standard.

Session Initiation Protocol

Session Initiation Protocol (SIP), an IETF sponsored standard, is gaining acceptance as an alternative to H.323 in IP telephony for call establishment and call signaling. However, for the purposes of "initiating" a session (or meeting), the protocol is significantly simpler than corresponding H.323 signaling. Unlike H.323, which requires the use of ASN.1 PER (a relatively complex binary encoding), SIP uses simple text-based messages. Encoding and decoding SIP messages is trivial, requiring the client to process less code during the basic call signaling messages.

The H.323 protocol utilizes a more traditional circuit-switched approach to signaling based on the ISDN Q.931 protocol and earlier H-series recommendations. Utilizing a more lightweight Internet approach based on HTTP, a protocol commonly used by web browsers, the SIP protocol is smaller and faster than H.323. This more lightweight approach to setting up the call between conference participants is less flexible than the H.323 standard. However, if you can live with some of the restrictions it imposes, it overcomes some of the undesirable shortcomings of H.323. For example, establishing an H.323v1 call can around a dozen packets and about 6 to 7 round-trip times, depending on how connections and packets overlapped. For a modem connection, where transmission delays are substantial, setting up an H.323 call can take several seconds. However, setting up a SIP call via UDP takes 1.5 round trip times and four packets. Thus initial call setup is substantially faster using the SIP protocol. In addition to the improved speed of call setup, the footprint in terms of code size of the SIP protocol is significantly smaller than the H.323 protocol. This reduced size can add up to a big time saving in the case of a client that is downloaded via the network such as the Sametime MRC and BC clients. For more information on the SIP protocol, the reader may review the actual published standard.

Realtime Transport Protocol (RTP)

The Realtime Transport Protocol (RTP) is a method for formatting multimedia data for transport on a computer network. It consists of various headers that are applied to chunks of audio and video data to form a packet. The purpose is to identify the type of data that is enclosed in the packet and also provide a method for sequencing the chucks of data so that they can be reassembled in the proper sequence when they are received at the destination. In addition to sequence information, the RTP headers also contain a packet time stamp and source identifying information that will be used by the destination to synchronize the various packets that it receives. For example, one participant's client in an audio/video conference will separately format each audio and video stream that it emits into separate RTP formatted packet streams. This allows the recipient to properly resequence any packets that may have been misordered by the network and then decode the incoming packets for playing at the correct time so that the video will be synchronized with the audio. The RTP protocol also had an imbedded control protocol called RTCP which is used to send transmission statistics and other information between the participants in a conference. For more information on the RTP protocol, the reader may review the actual published standard.

User Datagram Protocol (UDP)

Audio and video streams travel between endpoints using an unreliable connectionless form of IP communications known as UDP (User Datagram Protocol). Unreliable means that the packets are not guaranteed to arrive in order and possibly may not even arrive at all. Connectionless means that an active connection between the two endpoints is not maintained. If one endpoint goes away, the other endpoint will not be notified of this event. In the illustrative embodiment of the present invention, audio and video data streams are packetized according to the RTP protocol but the UDP protocol is used as the transport mechanism to carry the packets across a network. For more information on the UDP protocol, the reader may review the actual published standard.

TCP is protocol is also a data transmission protocol, but unlike UDP, TCP guarantees an ordered reliable delivery of data packets. As a result, the protocol is more complex and slower than UDP.

Unicast is a transmission mode for UDP that defines point to point communication between two endpoints. Multicast is a transport technology that can be used to optimize bandwidth usage when a large amount of data needs to be sent from one to many endpoints. This is accomplished by sending only one copy of the data across the network and having routers duplicate this data at the last possible point on a network.

Audio/Video Compression Standards

When sound and video images are captured by computer peripherals and are encoded and transferred into computer memory, the size (in number of bytes) for one seconds worth of audio or a single video image can be quite large. Considering that a conference is much longer than 1 second and that video is really made up of multiple images per second, the amount of multimedia data that needs to be transmitted between conference participants is quite staggering. To reduce the amount of data that that needs to flow between participants over existing non-dedicated network connections, the multimedia data can be compressed before it is transmitted and then decompressed by the receiver before it is rendered for the user. To promote interoperability, several standards have been developed for encoding and compressing multimedia data. The illustrative embodiment of the present invention, is described with reference to the G.711 and G.723 codecs, although other standards may be substituted without changing the scope of the invention. The G.11 standard is not so much a compression/decompression scheme as it is a standardized method for encoding audio data. G.711 encoded data can be quite large. One seconds worth of audio encoded can be 64K bits. The quality audio that is reproduced after an encoding/decoding cycle using the G.711 encoding scheme is quit good for most of the dynamic range of the human ear. It is not CD quality audio, but more like that of the telephone. Because of it's size, this standard is not recommended for conferences that take place over a standard modem.

The G.723.1 standard was developed to compress audio into a much smaller size than that of the G.711 encoding scheme. Where one seconds worth of audio using G.711 is 64K bits, the same seconds worth of audio compressed via G.723 is 6.3K bits. However, the more than 10 times reduction is size is not with out its costs. It takes a lot more CPU resources to compress audio data using G.723 than does encoding the same audio data using G.711. On today's faster computers this is not as much of a factor as it is on some of the older systems. The G.723 codec, however, was designed to compress only human speech. Audio in frequencies outside those of normal human speech are not handled very well by the G.723 codec. This means that if you are using G.723 to compress speech, it will decompress and sound very close to the original speech that was encoded. However, if you use G.723 to compress music, when it is decompressed and played, it will sound very different than the original music that was compressed.

Video Compression/Decompression

H.263 is a standard video-conferencing codec. As such, it is optimized for low bitrates (<64 k bits per second) and relatively low motion (someone talking). Although the H.263 standard supports several sizes of video images, the illustrative embodiment uses the size known as QCI F. This size is defined as 176 by 144 pixels per image. A QCIF-sized video image before it is processed by the H.263 compression standard is 38016 bytes in size. One seconds worth of full motion video, at thirty images per second, is 1,140,480 bytes of data. In order to compress this huge amount of data into a size of about 64 k bits, the compression algorithm utilizes the steps of: i) Differential Imaging; ii) Motion estimation/compensation; iii) Discrete Cosine Transform (DCT) Encoding; iv) Quantization and v) Entropy encoding. The first step in reducing the amount of data that is needed to represent a video image is Differential Imaging, that is, to subtract the previously transmitted image from the current image so that only the difference between the images is encoded. This means that areas of the image that do not change, for example the background, are not encoded. This type of image is referred to as a "P" frame. Because each "P" frame depends on the previous frame, it is common practice to periodically encode complete images so that the decoder can recover from "P" frames that may have been lost in transmission or to provide a complete starting point when video is first transmitted. These much larger complete images are called "I" frames.

The next step in reducing the amount of data that is needed to represent a video image is Motion estimation/compensation. The amount of data that is needed to represent a video image is further reduced by attempting to locate where areas of the previous image have moved to in the current image. This process is called motion estimation/compensation and reduces the amount of data that is encoded for the current image by moving blocks (16×16 pixels) from the previously encoded image into the correct position in the current image.

The next step in reducing the amount of data that is needed to represent a video image is Discrete Cosine Transform (DCT) Encoding. Each block of the image that must be encoded because it was not eliminated by either the differential images or the motions estimation/compensation steps is encoded using Discrete Cosine Transforms (DCT). These DCT are very good at compressing the data in the block into a small number of coefficients. This means that only a few DCT coefficients are required to recreate a recognizable copy of the block.

The next step in reducing the amount of data that is needed to represent a video image is Quantization. For a typical block of pixels, most of the coefficients produced by DCT encoding are close to zero. The quantizer step reduces the precision of each coefficient so that the coefficients near zero are set to zero leaving only a few significant non-zero coefficients.

The next step in reducing the amount of data that is needed to represent a video image is Entropy encoding. The last step is to use an entropy encoder (such as a Huffman encoder) to replace frequently occurring values with short binary codes and replaces infrequently occurring values with longer binary codes. This entropy encoding scheme is used to compress the remaining DCT coefficients into the actual data that that represents the current image.

Sametime Environment

Lotus Sametime is a family of real-time collaboration software products that provide awareness, conversation, and data sharing capabilities, the three foundations of real-time collaboration. It is within this framework that an illustrative embodiment of the present invention is being described, it being understood, however, that such environment is not meant to limit the scope of the invention or its applicability to other environments.

Awareness is the ability of a client process, e.g. a member of a team, to know when other client processes, e.g. other team members, are online. Conversations are networked between client processes and may occur using multiple formats including instant text messaging, audio and video involving multiple client processes. Data sharing is the ability of client processes to share documents or applications, typically in the form of objects.

The present invention may be implemented as an all software set of Multimedia Service extensions to the existing family of Sametime 1.0 or 1.5 products. Such Multimedia Services, referred to hereafter also as "Sametime", includes the Sametime Server 300, the Sametime Connect client 310, Sametime Meeting Room Client (MRC) 312, and Sametime Broadcast Client (BC) 314. The Sametime MRC 312, may be implemented as a thin mostly Java client that provides users with the ability to source/render real-time audio/video, share applications/whiteboards and send/receive instant messages in person to person conferences or multi-person conferences. The Sametime Broadcast Client 314 is used as a "receive only" client for receiving audio/video and shared application/whiteboard data that is sourced from the MRC client 312. Unlike the MRC client, the BC client does not source audio/video or share applications. Both the MRC and BC clients run under a web browser and are downloaded and cached as need when the user enters a scheduled Sametime audio/video enabled meeting, as explained hereinafter in greater detail. The Sametime Server 300 supports the T.120 conferencing protocol standard, published by the ITU, and is also compatible with third-party client H.323 compliant applications like Microsoft's NetMeeting and Intel's ProShare. The Sametime Server 300 and Sametime Clients work seamlessly with commercially available browsers, such as NetScape Navigator version 4.5 and above, commercially available from America On-line, Reston, Va.; Microsoft Internet Explorer version 4.01 service pack 2 and above, commercially available from Microsoft Corporation, Redmond, Wash. or with Lotus Notes, commercially available from Lotus Development Corporation, Cambridge, Mass.

When implemented in a network environment, such as that afforded by the Sametime family of products, the present invention enables person to person audio and or video conferences, multi-person audio and or video meetings, as well as broadcast meetings that allow many people to participate by listening to and viewing a presentation or an online meeting. Audio and video capabilities can be used alone or in conjunction with other Sametime technologies such as application sharing, shared whiteboard, instant messaging and or Sametime awareness.

The Sametime environment is an architecture that consists of Java based clients that interact with the Sametime server. The MRC and BC clients are built to interface with the Sametime Client Application Programming Interface, published by Lotus Development Corporation, which provides the services necessary to support these clients and any user developed clients with the ability to setup conferences, capture, transmit and render audio and video in addition to interfacing with the other technologies of Sametime.

Figure 2:
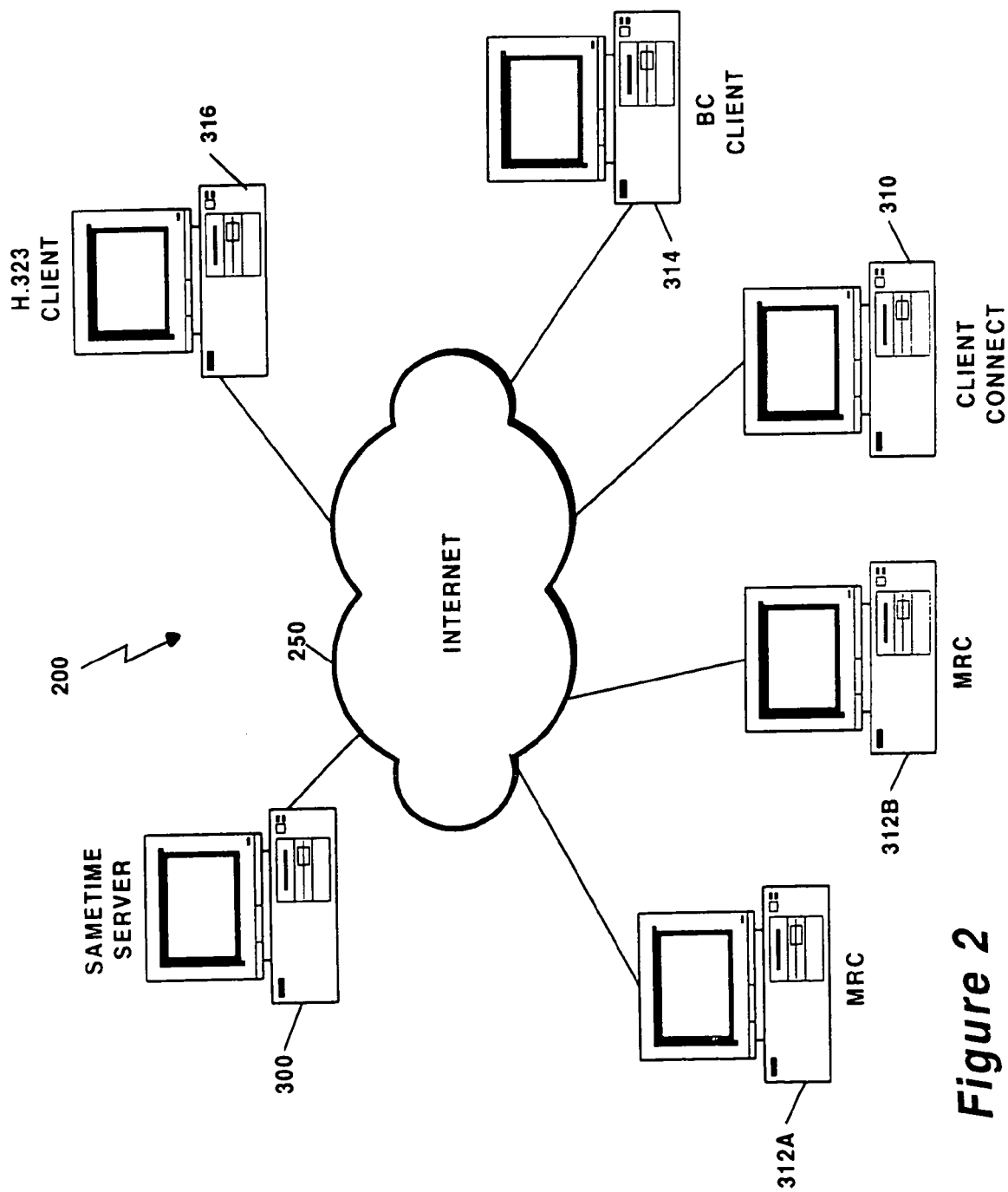
FIG. 2 is a conceptual illustration of a communications network environment in which the present invention may be utilized.

FIG. 2 illustrates a network environment in which the invention may be practiced, such environment being for exemplary purposes only and not to be considered limiting. Specifically, a packet-switched data network 200 comprises a server 300, a plurality of MRC client processes 312A-B, a BC client 314, an H.323 client process 316, a Sametime Connect client 310 and an Internet network topology 250, illustrated conceptually as a cloud. One or more of the elements coupled to network topology 250 may be connected directly or through Internet service providers, such as America On Line, Microsoft Network, Compuserve, etc.

Server 300 may be implemented as part of an all software application which executes on a computer architecture similar to that described with reference to FIG. 1. Server 300 may interface with Internet 250 over a dedicated connection, such as a T1, T2, or T3 connection. The client processes 310, 312, 314, and 316 may likewise be implemented as part of an all software application that run on a computer system similar to that described with reference to FIG. 1, or other architecture whether implemented as a personal computer or other data processing system. In the computer system on which a Sametime client process is executing, a sound card, such as sound card 197 accompanying the computer system 100 of FIG. 1, may be an MCI compliant sound card while a communication controller, such as controller 190 of FIG. 1, may be implemented through either an analog modem or a LAN-based TCP/IP network connector to enable Internet/Intranet connectivity.

Meeting Classes, Types and Modes

Sametime server 300 supports two different audio/video meeting classes: Instant Meetings and Scheduled Meetings. Under these classes, there are three different types of meetings: unmoderated, moderated or broadcast presentation. Lastly, there are also two different types of audio modes for these meetings: mixed audio and push to talk. This section will describe each of these classes, types and modes and explain how they all fit together to makeup Sametime audio/video meetings. Instant Meetings are similar to the telephone call paradigm. Like picking up the phone and dialing the phone number of a person to communicate with, a Sametime client simply selects the name of a person from the Connect Client 310 buddy list and places a call. The call can be a chat session, an audio call, an audio/video call, a data sharing session or any combination of these. Instant meetings are always moderated meetings, as described below. Scheduled Meetings are similar to the conference room paradigm. In order to hold a scheduled meeting the meeting must be setup with the Sametime server 300 in advance. Once a meeting has been created each participant can then come to the "Virtual Meeting Room" and join in the meeting. Like the instant meeting, a scheduled meeting can contain a chat session, audio conferencing, audio/video conferencing, a data sharing session or any combination of these. A scheduled meeting can be any of the three meeting types described below.

Unmoderated Meeting is a type of meeting that is designed for small groups of participants, typically two to ten. In an unmoderated meeting, every participant has the same capabilities and only the mixed audio mode described below is available. This type of meeting is a scheduled meeting.

Moderated Meeting is a type of meeting designed for larger groups of participants where it is important to have a moderator that can manage the flow of the meeting. The moderator is given tools that will allow them (if needed) to convert the meeting from a mixed audio mode to a push to talk mode meeting that forces participants to request the microphone before they can begin to talk. In addition to forcing some serial order to the meeting, the moderator also has the capability to grant and revoke the microphone from someone that may be monopolizing the meeting. This type of meeting can either be a scheduled or instant meeting.

Figure 3A:
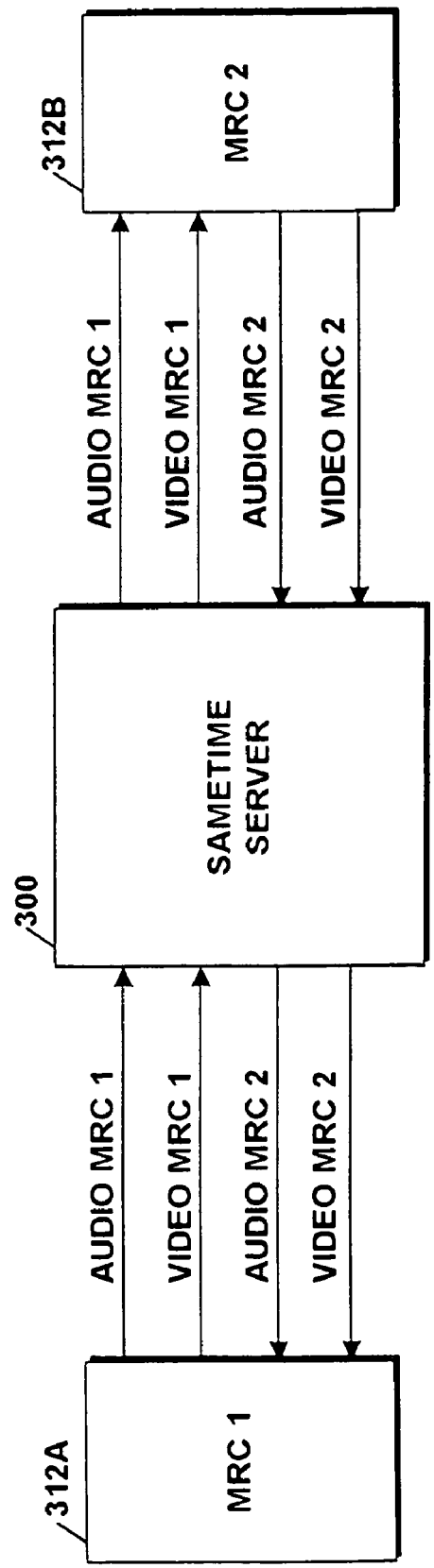
FIGS. 3A-D are conceptual illustrations of the various data streaming relationships between the multimedia conference server and a number of client processes in accordance with the present invention.
Figure 3B:
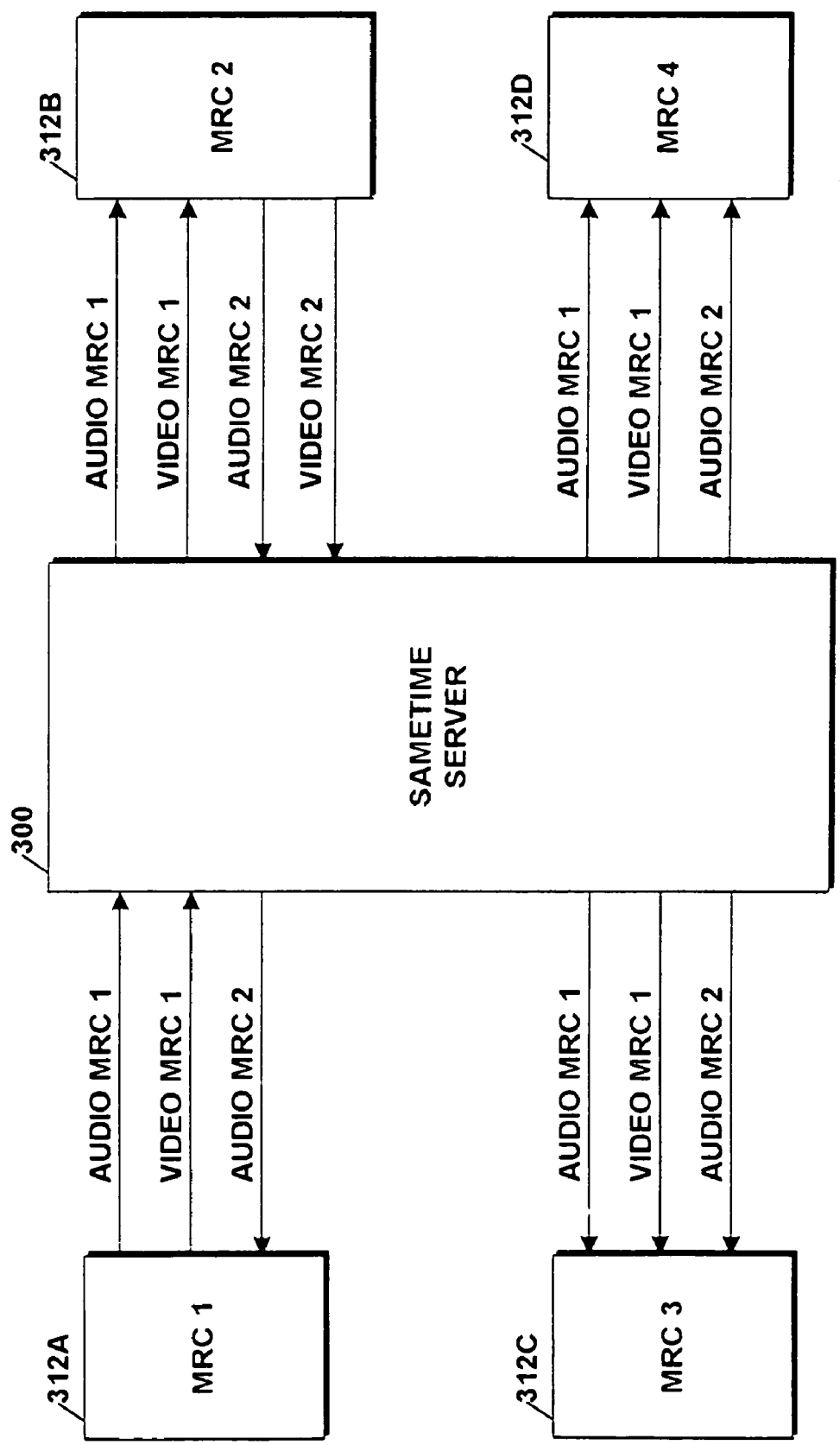
Figure 3C:
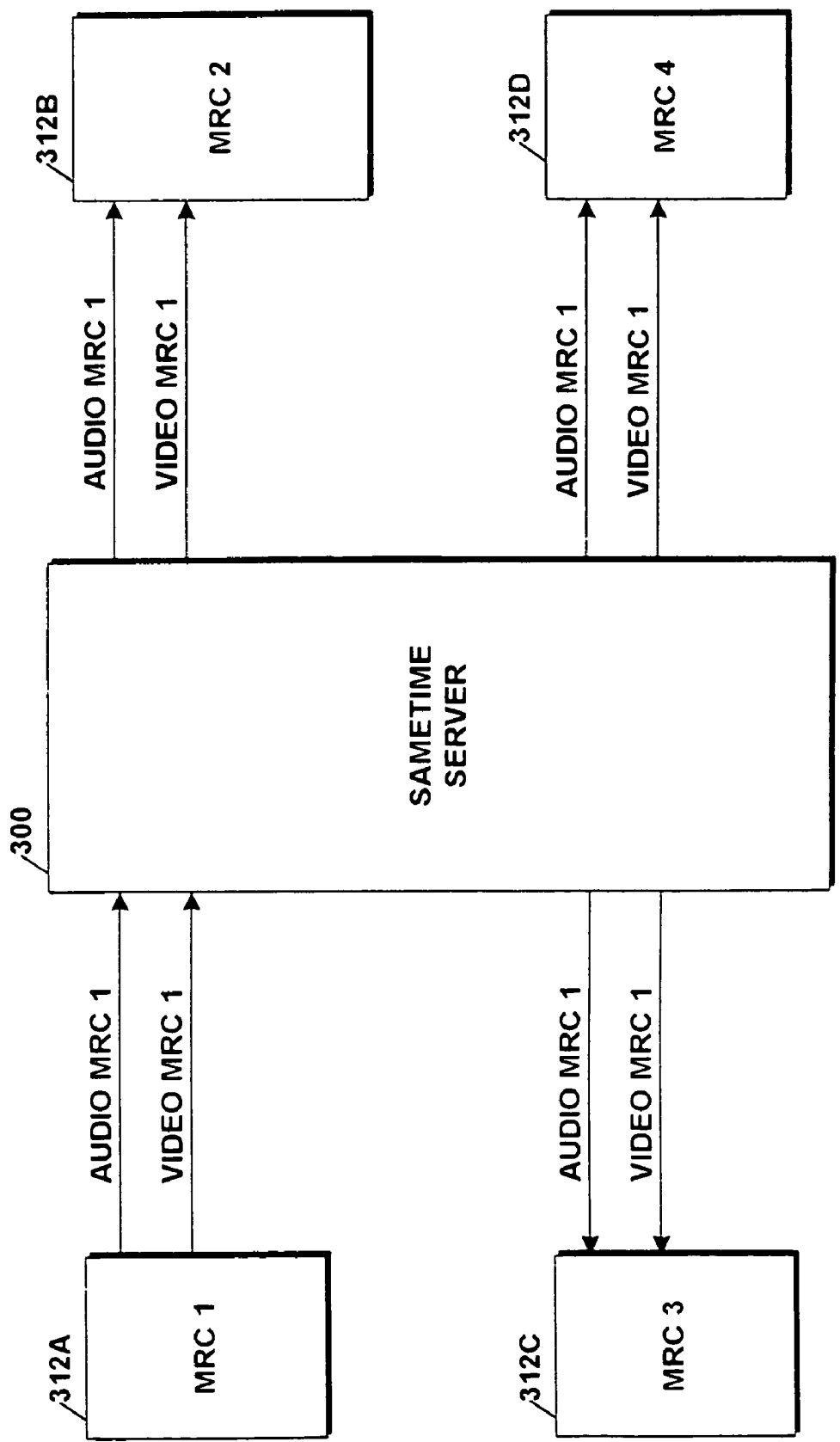
Figure 3D:
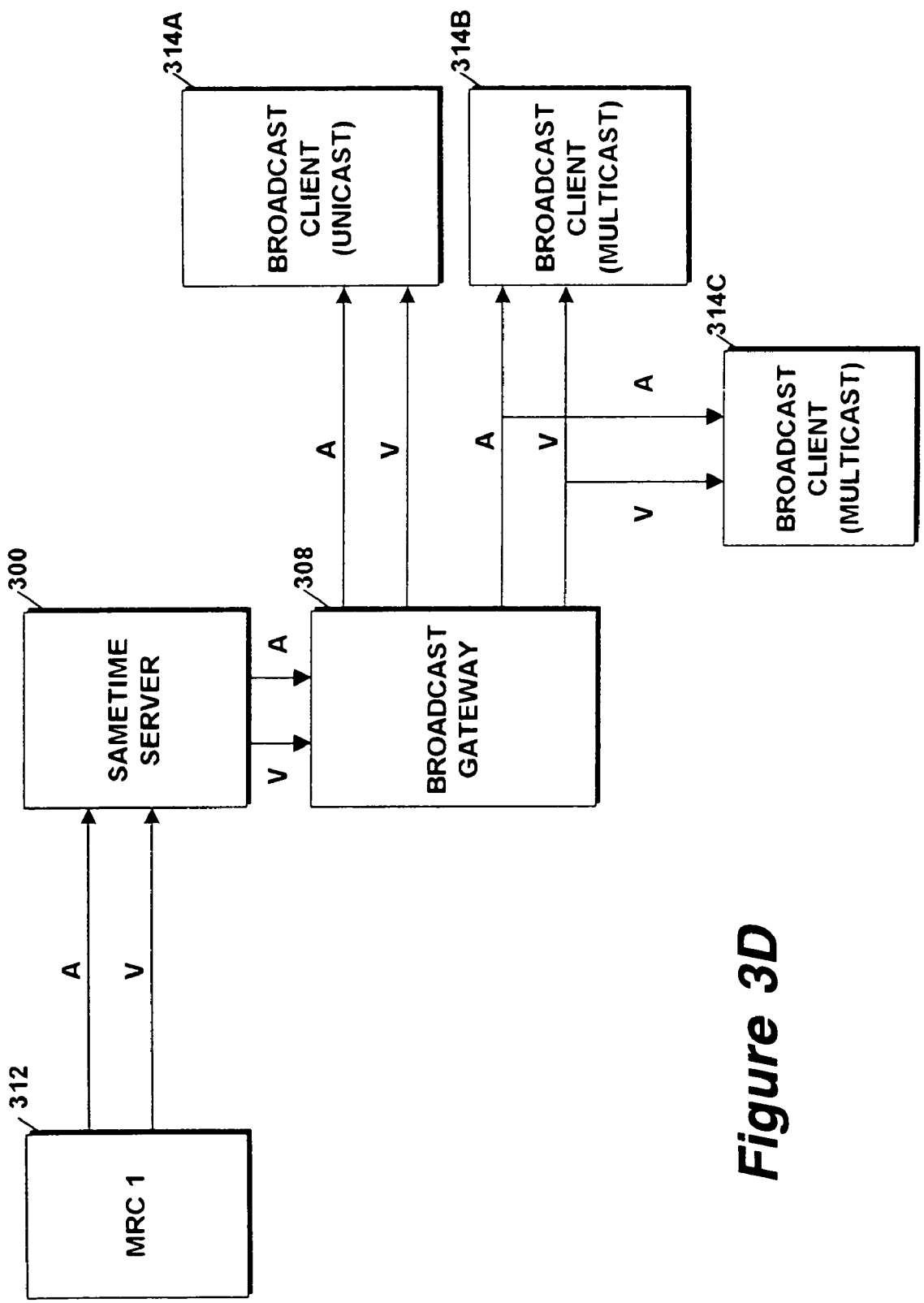

Broadcast Presentation is a type of meeting that allows the meeting's audio, video and data streams to be broadcast to a group of "receive only" participants. These participants use the BC client which is only capable of receiving the audio/video and shared data. "Receive Only" participants can not contribute in the conference or presentation. The BC client is automatically downloaded and cached by the browser when a person joins a Broadcast Presentation meeting. This type of meeting can be used to give company wide presentations, classes or allow a meeting or panel discussion to be broadcast to large groups of people. When a meeting is setup to be a Broadcast Presentation, the Sametime MMCU 302 and MMP 304 components that normally route the multimedia data between the MRC clients also send a copy of the streams to the Broadcast Gateway 308 which manages the various BC clients that join in to watch and hear the Sametime meeting. The Broadcast Gateway 308 allows BC clients 314 A-C to connect in via either UDP unicast, UDP multicast or a TCP/IP connection, as illustrated by FIG. 3D. This type of meeting is a scheduled meeting.

Audio Modes

The Mixed Audio mode is available with all meeting types and is designed for small groups of participants, typically two to ten. If there are only two participants in the conference, the audio and video streams are exchanged by the server 300 between the two participants, MRC Client 312A and 312B, as shown in FIG. 3A and as described hereinafter in greater detail. In this manner the server 300 is operating in full duplex mode. In other words, speaker number one will see and hear speaker number two. And speaker number two will see and hear speaker number one.

If one or more other people join the conference, the server 300 switches into "Primary Speaker" mode. In this mode, the MRC client will use a "Silence Detection" algorithm to determine if a participant is actively speaking. Only actively speaking participants will have their audio and video streams sent to the server. All other participants will have their audio and video streams suppressed in order to preserve network bandwidth and to assist with the switching algorithm running on the server. The server 300 then selects the first audio stream that it receives and designates this stream as coming from the "Primary Speaker". The audio and video from the "Primary Speaker" is then distributed by the server 300 to all participants in the conference. Only the video from the "Primary Speaker" will be echoed back to the Primary Speaker not their audio. For example, if one person is speaking in a four person conference, the speaker will only be able to see themselves, while the other three participants will be able to see and hear the speaker. If another participant starts speaking while the Primary Speaker is still talking, their audio and video data is also sent to the server 300. However, since the server already has a Primary Speaker the server 300 will assign the second person speaking as the "Secondary Speaker". Thus, only the audio streams from the first and second active speakers will distributed by the server 300 to all other conference participants. In this manner the server 300 is operating in multipoint mode as shown in FIG. 3B and as described hereinafter in greater detail. In other words, if two people are actively speaking, the audio and video streams from the first person to speak are sent out by the server 300, and only the audio stream from the second person is sent out by the server 300. The audio streams from the Primary Speaker and Secondary Speaker are mixed at the MRC client. e.g. decompressed and combined into a single signal. When the Primary Speaker stops speaking, the Primary Speaker assignment will be shifted to any active Secondary Speaker or will be reset waiting for the next stream to be received by the server.

Push to Talk mode is designed for larger groups of participants where it is important to have a moderator manage the flow of the meeting. The moderator is given tools that will allow them (if needed) to convert the meeting from a mixed audio mode, as described above, to a Push to Talk type meeting. In a Push to Talk meeting participants must request the microphone before they can begin to talk. These requests are placed in and maintained in a queue by the server. When the microphone becomes available, the server will automatically pass the microphone to the next person in the queue. In addition to forcing some serial order to the meeting, the moderator also has the capability to revoke the microphone from someone that may be monopolizing the meeting. In a Push to Talk meeting only the audio (and video) of the person that currently has the microphone is broadcast to the rest of the meeting, as shown in FIG. 3C and as described in greater detail hereinafter. The video that is distributed by server 300 is the video from the person that currently has the microphone.

Sametime Server

Figure 4:
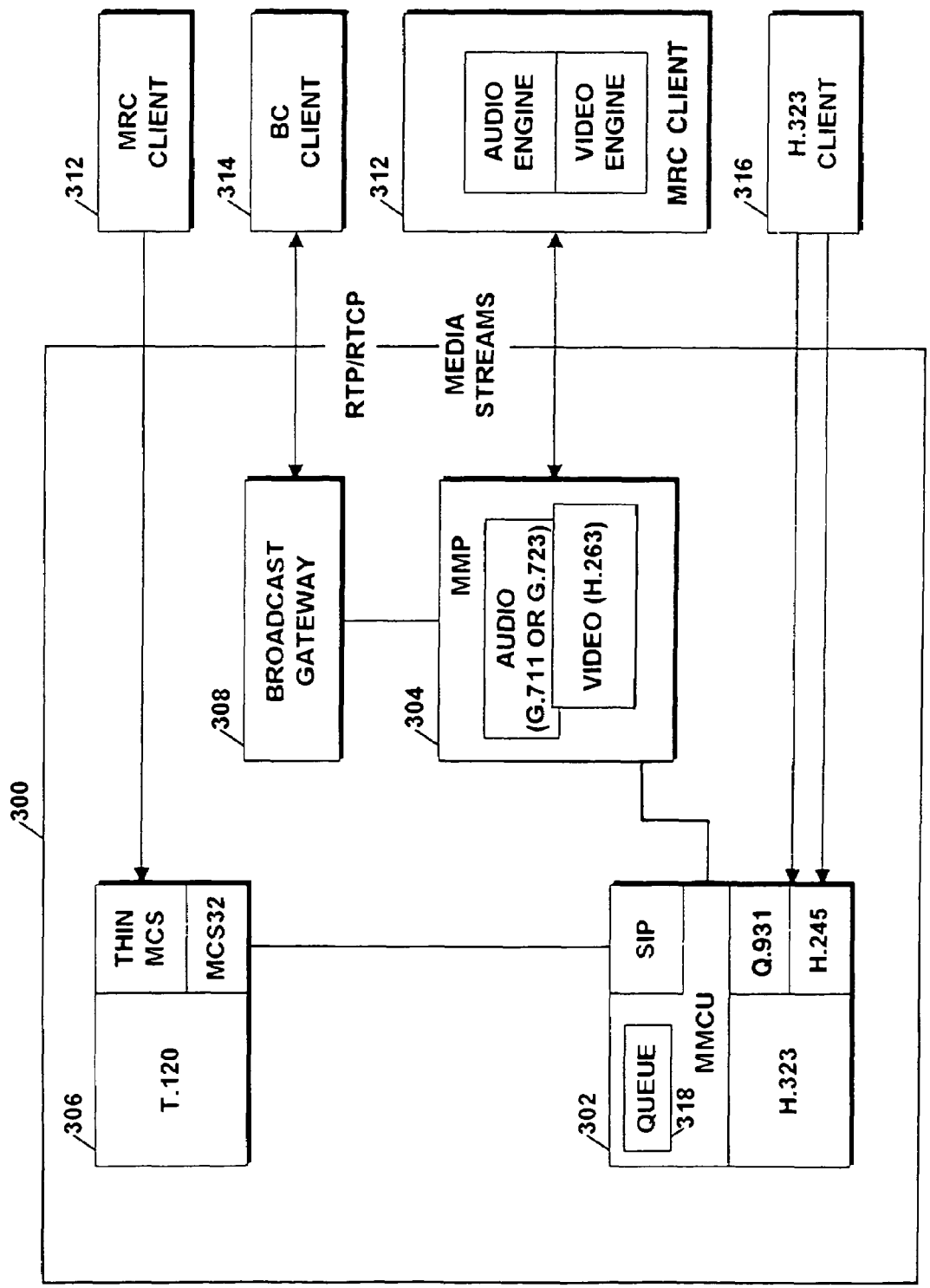
FIG. 4 is a block diagram conceptually illustrating the functional components of the multimedia conference server in accordance with the present invention.

As shown in FIG. 4, in the illustrative embodiment, the Sametime server 300 comprises a Multimedia Control Unit (MMCU) 302 for hosting multipoint conferences, a Multimedia Processor (MMP) 304 for controlling and processing media streams, a T.120 stack 306 and a Broadcast Gateway 308 for transcoding and broadcasting real-time audio, video and data for reception by the Sametime BC clients 314. The Sametime Server 300 manages the H.323 connections and routes the appropriate audio and video streams between the H.323 clients and the Sametime clients. All audio/video streams emitted from an MRC 312 is packaged using the RTP protocol and is sent via the SIP protocol from the MRC client to the MMP 304 and thereafter to either the other client processes in the meeting or to the Broadcast Gateway 308 for transmission to the Sametime BC clients 314.

The MMCU 302 and the MMP 304 are server-based components that provide the multipoint audio and video services for the server 300 and enable the client processes, e.g. the Sametime Client or an H.323 endpoint, to participant in real-time collaborations that include audio and video content. Since the MMCU 302 and the MMP 304 work cooperatively to enable such services their combined functionality may be referred to hereinafter as the "MMCU/MMP". The MMCU/MMP components of the server use a switching technique to create a multipoint audio and video experience for the client processes, as explained hereinafter.

As shown in FIG. 4, Sametime MCR clients 312 interface with server 300 for nonmultimedia services such as whiteboarding, chat and data sharing through socket connections with the T.120 stack 306 of server 300. Sametime MCR clients 312 interface with server 300 for multimedia services, including audio and/or video streaming through MMP 304, as illustrated. All interfacing between Sametime BC clients 314 with server 300 occurs through Broadcast Gateway 308. H.323 Clients 316, including non-multipoint H.323 clients, interface with server 300 for both multimedia and nonmultimedia services through the H.323 interface portion of MMCU 302, as illustrated.

Multimedia Control Unit (MMCU)

The MMCU 302 is the server component primarily responsible for managing the control channels between the client processes and the server 300.

When a client process establishes a connection to the Sametime server 300, the MMCU 302 will inform the client process about the meeting attributes, for example, whether video is present and which codecs are to be used. The MMCU component of the server is notified whenever audio and video activities are to be utilized within the context of a Meeting or place within the Sametime environment. Upon such notification, which may be an event received by the MMCU 302 over an event bus, the MMCU acquires all relevant information related to set up audio and video within the meeting. Following notification, the MMCU 302 registers with a Sametime event database in order to monitor meeting events. In addition, the MMCU attaches itself to MCS32 interface of the T.120 stack 306. This T.120 interface allows the MMCU to communicate with the client processes via SIP.

In the illustrative embodiment, the MMCU component of Sametime server 300 may be implemented using object-oriented technology. Specifically, the MMCU may be written to contain program code which creates the objects, including appropriate attributes and methods, which are necessary to perform the processes described herein and interact with the client processes in the manner described herein. Alternatively, the MMCU component of Sametime server 300 may be implemented using traditional algorithmic program code which performs the processes and interacts with the client processes in the manner described herein. As shown in FIG. 4, the MMCU 302 implements an SIP type network interface, to connect to T.120 stack 306, and an H.323 compliant network interface to connect to H.323 clients 316.

The MMCU 302 monitors when a meeting becomes active and when the meeting finishes. When a meeting goes active, the MMCU reads the associated meeting document within the Sametime Meeting Center or other associated database. From this data, the MMCU 302 determines whether or not a meeting contains audio. Any meeting not containing audio is ignored by the MMCU.

Once the MMCU 302 determines that an active meeting contains audio, the MMCU creates a meeting object associated with the meeting. The meeting object contains the attributes defining the meeting or place as well as global server settings defined by a system administrator.

The following list outlines some of the more significant attributes associated with a Sametime meeting:

Audio Codec (G.711 or G.723)
Video Codec (H.263)
Video Frame Rate
Video Bit Rate (16 Kbps to 128 Kbps)
Permit/Deny H.323 endpoints (H.323 endpoints cannot be authenticated)
H.323 Meeting Identifier (used by H.323 endpoints to join meeting)
Encryption Enabled Once the meeting is created, the MMCU notifies the MMP of all relevant meeting details and creates an instance of a media stream object within the MMP—one for each media stream type. For instance, if a meeting has both audio and video, two media stream objects will be created—one to handle audio and the other to handle video. When a meeting ends, e.g. when an event is received, the MMCU will shutdown all active connections to client processes and notify the MMP that the meeting no longer exist.

Multimedia Processor (MMP)

The MMP is the component of the server 300 responsible for managing the media streams. All media streams flow from the client processes to the MMP 304 and then back to the client processes 330A-E. All of the switching functionality within server 300 is handled by the MMP 304. The MMP 304 interfaces with the MMCU 302 via, for example, DCOM, pipes or RIC, so that MMP 304 can be distributed on to different servers separate from the conference server 300. It is possible for an instance of the MMP 304 to be running on many different systems but which all service one MMCU 302.

In the illustrative embodiment, the MMP component of Sametime server 300 may be implemented using object-oriented technology. Specifically, the MMP may be written to contain program code which creates the objects, including appropriate attributes and methods, which are necessary to perform the processes described herein and interact with the client processes in the manner described herein. Alternatively, the MMP component of Sametime server 300 may be implemented using traditional algorithmic program code which performs the processes and interacts with the client processes in the manner described herein.

The MMCU 302 receives certain events from the MMP 304. For instance, when the audio switches from one client process to another client process, the MMCU 302 receives an event as to which client process is the active presenter. The MMCU 302 monitors which participants is/are the active speaker(s). When the active presenter changes, the MMCU 302 will make a call into the MMP 304 to set the video source to the active presenter provided, that video is available for the meeting. If the active presenter does not have video or the video has been paused, the MMCU will send an event to all client processes, either done through SIP for the Sametime Meeting Room Client or through H.245 for H.323 clients, that the received video window should be paused. In order to support conductorship, the MMCU 302 will notify the MMP 304 as to which client processes have permission to source audio. For those client connections that do not have permission, the MMP 304 will ignore the input audio stream.

Sequence Numbers

Data may be streamed between the server 300 and the client processes using Real-Time Protocol (RTP). RTP is an industry standard protocol for real-time transmission of packets containing data such as audio or video. In accordance with real-time protocol, packets of data are presented in a predetermined sequence, regardless of the order in which the packets were received. Each packet contains among other things a payload type, sequence number, and timestamp. The packet also contains the data relative to the codec as part of the payload. Each RTP packet has a sequence number as part of the RTP packet header. The purpose of the sequence number is so that the client process receiving the packets knows the proper order in which to play back the packets.

There is a class of H.323 clients that do not support multipoint conferences, e.g. conferences in which any of multiple client processes may be the source of audio and/or video, referred to here after as "non-multipoint H.323 client(s)" or "non-multipoint H.323 client processes". For these types of non-multipoint H.323 clients the MMP 304 must modify the RTP headers of the broadcast data streams so that when received by the non-multipoint H.323 client they always appear to come form a single source, regardless of who is speaking. Note that the Sametime MRC and BC clients do not require modification of the RTP header. Instead the Sametime clients are designed to handle reception of streams from multiple sources.

In the case of non-multipoint H.323 clients, because the MMP 304 may switch between many different client processes during the course of a meeting, the MMP ensure that sequence numbers associated with the RTP packets remain consistent for a receiving non-multipoint H.323 client, e.g. the MMP 304 cannot merely send the sequence number from the sending client process to the receiving non-multipoint H.323 client process. The MMP 304, using objects or equivalent algorithmic code, maintains the last sequence number sent to each non-multipoint H.323 client process and the last received packet number from each client process. When a non-multipoint H.323 client connects to the server 300, these values are initialized to zero. As packets are received and sent, the sequence numbers are updated for each non-multipoint H.323 client process. For example, assume three non-multipoint H.323 client processes, A, B, and C, are currently connected to a meeting. Client B and C have been in the meeting for a some time prior to Client A. The outbound sequence number for Client B is 100 and Client C is 125. Client A has become the active presenter. The following table shows the outbound sequence numbers for Clients B and C that are dependent upon the inbound sequence number received for Client A.

| Client A  | Client B   | Client C   |
| (Inbound) | (Outbound) | (Outbound) |
|-----------|------------|------------|
| 4         | 104        | 129        |
| 1         | 101        | 126        |
| 2         | 102        | 127        |
| 3         | 103        | 128        |
| 5         | 105        | 130        |
| 6         | 106        | 131        |
| 8         | 108        | 133        |
| 7         | 107        | 132        |
| 9         | 109        | 134        |

In the above example, sequence number 4 was the first packet received from Client A. Because the value of the last packet received from Client A was initialized to zero, the difference is four. The value of four is then added to the outbound sequence number for Clients B and C. For the next packet, sequence number 1 is received from Client A. The difference between this packet and the last packet received is −3 (1−4). Therefore, the next sequence number of Clients C and B is the last sequence number sent minus three.

Timestamps

Like the sequence numbers, each RTP packet header has a timestamp associated therewith. The client process places this timestamp in the packet header. The receiving client process uses the timestamp to determine the proper time to play back the packet. As with sequence numbers, the server 300 must maintain the outbound timestamp for non-mulitpoint H.323 clients. The server 300 cannot simply pass the inbound timestamp to each outbound stream because as the source switches between inbound streams, that timestamp value would be meaningless to the outbound client.

The actual value of a timestamp is dependent upon the type of data in the payload. For instance, in the case of the G.723 audio codec, the value of the timestamp is based upon 240 samples per frame. Each frame of data contains 20 or 24 bytes of data depending upon the encoding method and equates to 30 ms of time. If audio is being continuously streamed and there is one frame per packet, the value of the timestamp will increase by 240 for each packet.

When the MMP 304 switches to another inbound stream, the MMP will store the value of the current server time. Then, as each new inbound packet is sent to the outbound non-multipoint H.323 clients, the value of the stored server time will be incremented by the difference (either positive or negative depending if packets are received out of order) of the current and last received packet of the inbound client. This server time value will be used for outbound non-multipoint H.323 clients.

Sequence Source Identifiers

Non-mulitpoint client processes adhering to the H.323 protocol require further special consideration in the present invention. Specifically, since a non-mulitpoint H.323 client can only conduct communications with another single H.323 client, the continual switching among audio data streams from other client processes participating in the conference presents a problem for H.323 clients. The present invention overcomes this limitation by manipulating the sequence source identifier (SSRC), in addition to the sequence numbers and timestamps, in the RTP packet header prior to transmitting outbound packet streams to a non-multipoint H.323 client. For example, the server 300, specifically the MMP 304, replaces the SSRC value in the packet header of each packet with its own SSRC information prior to transmitting the packet stream to the non-multipoint H.323 client process. As a result, the H.323 client process is spoofed into believing it is communicating with a single H.323 client, instead of the conference server which is selectively multiplexing audio streams from multiple participating client processes in the conference. As with the sequence numbers, the MMP 304 may utilize objects or equivalent algorithmic code to achieve manipulation of time stamps and SSRC data as described above.

In the illustrative embodiment, the Broadcast Gateway 308 component of Sametime server 300 may be implemented using object-oriented technology. Specifically, the Broadcast Gateway may be written to contain program code which creates the objects, including appropriate attributes and methods, which are necessary to perform the replication and transmission of streamed data to Sametime Broadcast clients 316.

The T.120 stack 306 of server 300 implements a Thin MCS interface to communicate with Sametime MRC clients 312 for nonmultimedia services and an MCS32 interface to interact with the MMCU 302, as illustrated in FIG. 4. Unless indicated otherwise, the network interfaces implemented within MMCU 302 are in accordance with their respective published standards and any amendments thereto. It will be appreciated that other equivalent standard interfaces may likewise be used without limiting the scope of the invention.

Sametime Clients

The heart of the Sametime environment is an architecture that consists of Java based clients that interact with the Sametime server. The Sametime clients include Sametime Connect client 310, Sametime Meeting Room Client 312, and Sametime Broadcast Client 314. The MRC 312 and BC 314 clients are built to interface with the Sametime Client Application Programming Interface, published by Lotus Development Corporation. The Sametime Client Application Programming Interface provide the services necessary to support these clients and any user developed clients with the ability to setup conferences, capture, transmit and render audio and video in addition to interfacing with the other technologies of Sametime.

The Sametime MRC 312, may be implemented as a Java client that provides users with the ability to source/render real-time audio/video, share applications/whiteboards and send/receive instant messages in person to person conferences or multi-person conferences. The Sametime Broadcast Client 314 is used as a "receive only" client for receiving audio/video and shared application/whiteboard data that is sourced from the MRC client. Unlike the MRC client 312, the BC client 314 can not source audio/video or share applications. Both the MRC and BC clients run under a web browser and are downloaded and cached as need when the user joins a scheduled Sametime audio/video enabled meeting, as explained hereinafter in greater detail.

In addition to the MRC being launched when a user enters a scheduled Sametime audio/video meeting, the MRC can also be launched from the Sametime Connect client as is the case of "instant meetings". This may be done by selecting a name in the Connect Client's buddy list window with a mouse button, to select the desired form of communication (audio, audio/video, etc. . . . ). This action will invite the selected participant and if they accept the invocation, the MRC will automatically be launched for each of the participants.

In the illustrative embodiment, the MRC and BC component of Sametime environment may be implemented using object-oriented technology. Specifically, the MRC and BC may be written to contain program code which creates the objects, including appropriate attributes and methods, which are necessary to perform the processes described herein and interact with the Sametime server 300 in the manner described herein. Specifically, the Sametime MRC client includes an audio engine which is capable of detecting silence, capturing audio data, compressing the audio data, transmitting the packetized audio data to the server 300, receiving and decompressing one or more streams of packetized audio data, mixing multiple streams of audio data, and playback of the audio data. Sametime clients which are capable of receiving multiple audio streams also perform mixing of the data payload locally within the client audio engine using any number of known algorithms for mixing of multiple audio streams prior to playback thereof. Further, the Sametime clients includes a video engine which is capable of capturing video data, compressing the video data, transmitting the packetized audio data to the server 300, receiving packetized video data, decompressing the video data, and playback of the video data. The codecs used within the Sametime clients for audio and video may be any of those described herein or other available codecs. In the illustrative embodiment, the Meeting Room Client 312 may be implemented as a JAVA application.

The Sametime server is responsible for providing interoperability between the Meeting Room Client and H.323 endpoints. Both Sametime and H.323 endpoints utilize the same media stream protocol and content differing in the way they handle the connection to server 300 and setup of the call.

The MMCU 302 currently supports Sametime and H.323 type client connections. The Sametime Meeting Room Client uses the SIP connection method. Clients such as Microsoft NetMeeting use the H.323 connection method. The Sametime Meeting Room Client uses variant of the SIP protocol over the Thin MCS connection rather than establishing a direct connection the MMCU as a 3$^{rd}$ party SIP client would expect.

Jitter buffer management is implemented in the Sametime clients. Audio packets are streamed at a consistent rate. However, due to varying network conditions, the arrival time of packets is unpredictable. Some packets may arrive exactly as expected, while other packets may take longer to arrive. In addition, some packets may arrive out of order or even be lost. The jitter buffer will save several packets before playback occurs. For example, if each packet contains 30 ms of audio, the jitter buffer may save up to 10 packets. This adds 300 ms of latency to playback, but this significantly increases the overall quality. In a broadcast situation where no interaction is required, a jitter buffer size of 10 to 30 seconds may be more common.

The Sametime MRC communicates with the MMCU 302. For data, audio control, and video control, the client has a single connection to the Sametime Server 300. During the initial connection, the MMCU 302 informs the Sametime MRC client of the various attributes associated with a meeting. The MMCU 302 informs the client process which codecs to use for a meeting as well as any parameters necessary to control the codecs, for example the associated frame and bit rate for video.

Another important exchange of information between the client process and server 300 is the ports that will be used for media. When a client process establishes a connection, the MMCU 302 will create a client object within the MMP stream object. The MMP stream object will return a pair of port numbers. One port is for RTP and the other is for RTCP. When the client process sources audio or video, it will use these port numbers to send the source data to the server 300. Keep in mind that there is a pair of port numbers for each media stream type. The client process provides to the server 300 a pair of port numbers for each media stream type on which it expects to receive media data. The MMCU 302 passes these port number pairs to the MMP 304 for the associated media stream object.

The Sametime server 300 supports the H.323 standard to the extent that H.323 endpoints and PSTN users via an H.323 gateway can participate in audio and video meetings with other Sametime client processes. The MMCU 302 supports connections with H.323 endpoints. The MMCU listens for H.323 clients on port 1720. Once an H.323 client connects using the Q.931 protocol standard, the E.164 field is examined to determine which meeting the H.323 client wishes to join. This meeting identifier is like a telephone number for the meeting. During the creation of the meeting, if H.323 client processes are permitted to join the meeting, a unique H.323 meeting identifier must be assigned to the meeting. If the meeting does not allow H.323 client processes to be joined, the MMCU will terminate the client connection. Once a meeting has been identified, the MMCU transmits a dynamic TCP port according to Q.931 protocol in order for the client process and server 300 to continue the call setup using the H.245 protocol standard. During the H.245 setup phase, capabilities are exchanged and agreed upon between the client process and server 300. The server 300 does not allow the connection to continue unless the client abides by the codec and attribute settings for the meeting. The final step in the H.245 setup is the exchange of media RTP and RTCP ports. Real-Time Control Protocol (RTCP) is an industry standard for sending reports containing statistics about number of packets received, packets lost, and timestamps for synchronization purposes. RTCP can also contain transmission statistics from the sender, as well as canonical names associated with media sources. This is the same procedure as the Sametime Meeting Room Client and SIP. Both H.323 client processes and PSTN users connected through an H.323 gateway are supported in this manner.

The MMCU 302 also broadcasts an attribute to each participant to a meeting which identified the parties whose audio data is being broadcast the participating client processes. The MMCU detects an audio stream source from a client process and retrieves the identification information from memory or a database. The identifier may comprise a name, a network address, an E.164 telephone number, or other information which may be useful to the participating client processes.

Server Operation

Server 300 supports Full Duplex Mode, Multipoint mode and Push to Talk mode. Full duplex describes the mode in which audio is transmitted and received between participants to a conference or meeting. A telephone conversation using a standard telephone handset, uses full-duplex mode, meaning that while one participant is speaking, the other participant can also hear the other participant talking. This more natural conversation form allows a participant to begin speaking at the end of the other participant's remarks, or even to interrupt that participant. Conversely, half-duplex mode is like a speakerphone which prevents the speaking participant from hearing anything that the another participant is saying while the participant speaking. Server 300 supports the concept of full-duplex mode when there are only two client processes participating in a meeting. In this case, the audio and video streams from one client process are sent to the other client process and vice-versa. In this scenario, the MMP monitors and modifies the sequence numbers and timestamps, as necessary, in the same manner as previously described for H.323 clients.

In the illustrative embodiment, the MMP 304 locks on to two inbound audio streams, however, it should be understood that this example is not limiting. The MMP 304 may be designed to receive and retransmit more than two audio streams. One stream will be designated as primary and the other as secondary. The primary stream is the stream that has been sourcing the longest. This does not mean the stream that has been connected the longest. As the primary stream stops sourcing and the secondary stream continues to source, the secondary stream will become the primary stream.

The MMP will send both the primary and secondary audio streams in unmixed, e.g. as two separate data streams, to all clients capable of receiving two streams. The client processes mix the primary and secondary audio streams locally to form a single audio signal for listening. In the case of client processes conforming to the H.323 standard, only the primary stream will be sent, except if an H.323 client process is the primary or secondary source. In that scenario, such H.323 client process will receive the other stream if available.

Figure 5:
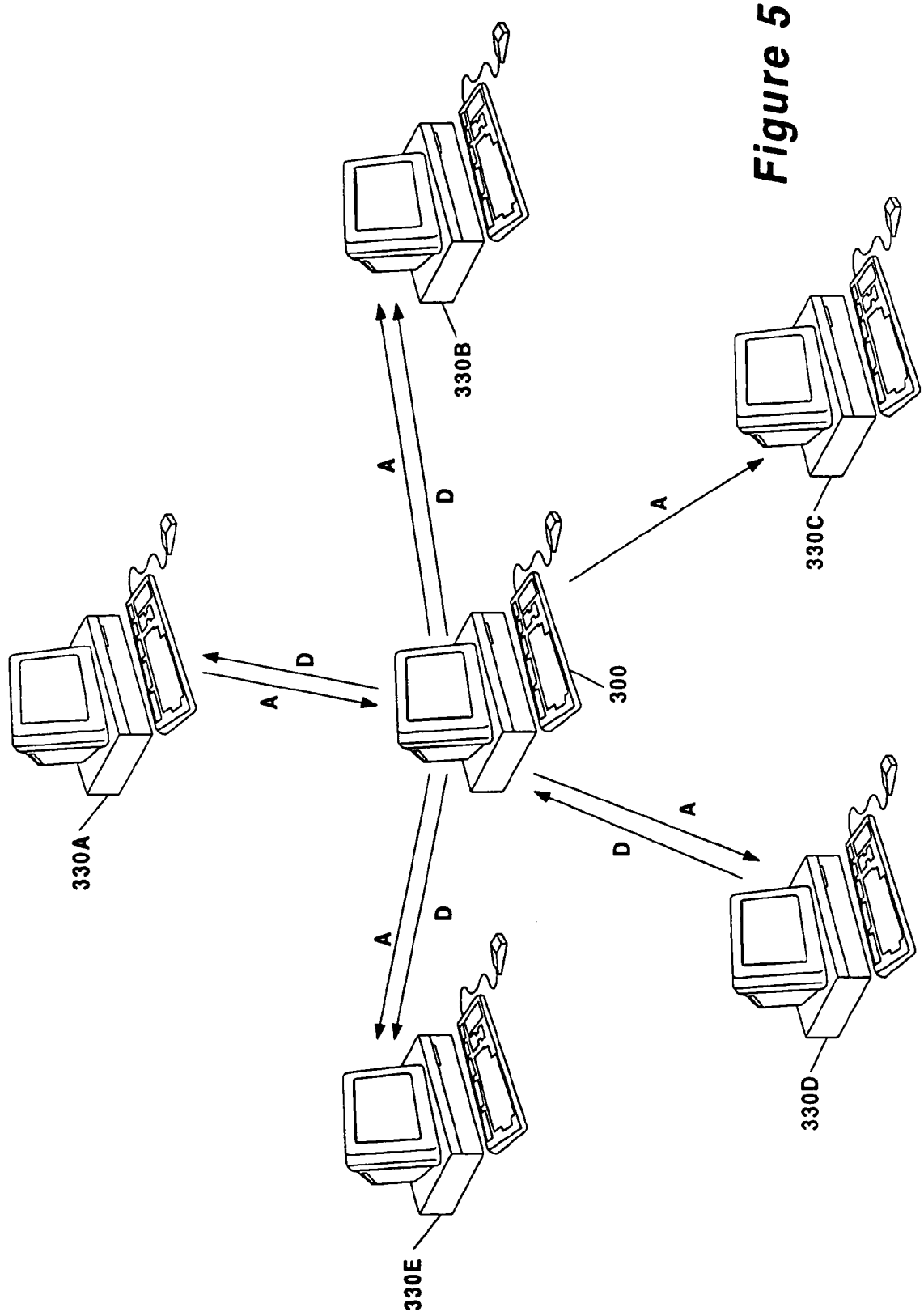
FIG. 5 is a conceptual illustration of the data streaming relationship between the multimedia conference server application and a number of client processes in accordance with the present invention.

Referring to FIG. 5, server 300, through the MMCU/MMP, receives and monitors inbound audio packet streams from client processes 330A-E, as indicated by data streams A-E, respectively. Once no-silence audio packets are received from any of the client processes 300A-E, the MMCU/MMP of server 300 "locks" onto a first of such client processes and broadcasts these packets to other client processes in the "meeting", as indicated by the retransmission of packets stream A to each of client processes 330A-E. In the present invention, the MMCU/MMP has the ability to lock onto multiple audio input streams simultaneously, as described hereafter in greater detail. Client processes capable of receiving more than one audio stream will receive multiple audio streams, as indicated by the retransmission or broadcast of packet stream D to each of client processes 330A-B and 330D-E. Client processes receiving multiple audio streams are expected to mix the streams before playback to the user in accordance with techniques known in the relevant signal processing arts. Client processes, such as client process 330C, which are unable to receive multiple streams, receive only one of the multiple streams. After the client process sourcing one of the active audio packet streams has gone silent, e.g. begins transmitting silence for a predetermined period of time, the MMCU/MMP then scans for other active audio client processes.

In the illustrative embodiment, client processes 330A-E perform silence detection as part of the process with which the audio data is encoded and transmitted to server 300. Otherwise, if a client process continued streaming audio packets that only contained silence, the MMCU/MMP would be unable to switch to other clients processes because the MMCU/MMP would be unaware that the packets only contained silence. In order for the MMCU/MMP to detect silence in the received audio packets, it would have to decode and analyze these packets. This would significantly increase CPU utilization thereby affecting scalability. Overall latency would increase because the audio packet would be delayed before sending it out to the receiving clients.

In the illustrative embodiment, client processes 330A-E that send audio have the ability to detect and not send silence packets. Accordingly, because audio packets are not being sent from a client process, the MMCU/MMP does not switch to that client process. MMCU/MMP determines that an audio stream is no longer active when no audio data is received within a threshold period of time, such threshold may be set by a system administrator or may be defined on a meeting by meeting basis. When such threshold is reached the MMCU/MMP begins to accept audio data from another active client process to the conference, for example, the next client process to send audio data packets, or, in the "Push to Talk" mode, the next requesting client in queue, as explained hereinafter in greater detail.

The conference server 300 of the present invention is not limited to broadcasting of just audio data streams but is also capable of broadcasting packetized video data. In the illustrative embodiment, the MMCU/MMP broadcasts the video streams of the client process whose audio stream is being broadcast. i.e. the video follows the audio. Once the MMCU/MMP has locked onto a client process as a source of audio data, if that client process is also sourcing video data, the MMCU/MMP will broadcast that video stream to all other client processes.

In order to prevent the video stream source from switching too quickly between active presenters, the MMCU/MMP will not lock onto the video stream of a client process until a minimum threshold has been reached. e.g. a minimum switch time.

Figure 6:
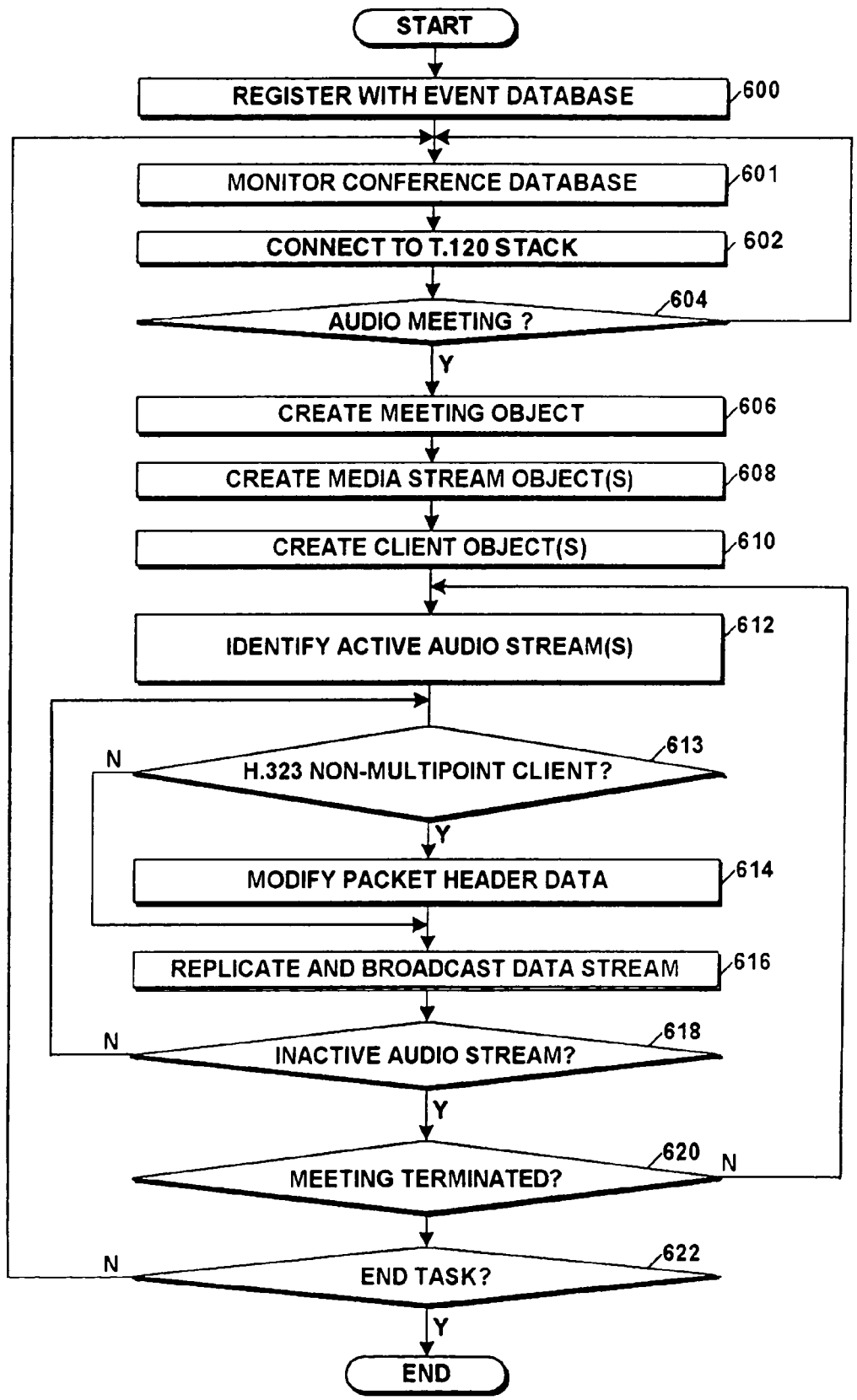
FIG. 6 illustrates the process steps performed by the multimedia conference server in a multipoint or full duplex mode in accordance with the present invention.

Referring to FIG. 6, a flow chart of the process steps performed by Sametime server 300 during a meeting is illustrated. First, the MMCU 302 of server 300 registers with the Sametime event database, as designated by procedural step 600, and monitors the conference database to determine if a Sametime meeting with audio is occurring, as designated by procedural step 601. In addition, the MMCU interfaces with T.120 306 to enable communication with client processes, as indicated by procedural step 602. A meeting may be a scheduled meeting or an instant meeting, as explained previously. If a meeting occurs, as designated by decisional step 604, the MMCU 302 will create a meeting object, as indicated by step 606. The meeting object contains, in its attributes, information regarding parameters such as audio codec, video codec, video frame rates, encryption enablement, meeting identifier (for H.323 client processes), etc. Next, the MMCU 302 instantiates a stream object within the MMP 304 for each media stream type, as indicated by procedural step 608. If the meeting has both audio and video, two media streams will be created, one for video and one for audio.

Next, the MMCU 302 will create a client object within each MMP stream object for each client process which establishes a connection to the Sametime server 300 via the T.120 stack interface, as illustrated by procedural step 610. Within this process, the MMP stream object provides a pair of port numbers to the connecting client process. This process step 610 is repeated for each new client process "joining" a Sametime meeting. Thereafter, the MMCU 302 monitors which clients are actively generating streams of audio data and identifies at least first and second active audio streams using the technique described herein, as illustrated by procedural step 612. The MMP 304 component of server 300 receives each packet from an active audio stream and manipulates the time stamp, sequence number, and sequence source identifier, as necessary for each respective non-mulitpoint H.323 client process receiving audio data in the meeting as illustrated by decisional step 613 and procedural step 614. No packet header modification is necessary for receiving Sametime clients 312 and 314. Next, the content of each packet is replicated and broadcast to the client process to the conference, as illustrated by procedural step 616. The MMCU 302 monitors when a client process becomes inactive, e.g., ceases to transmit active audio for a threshold period of time as defined within the meeting attributes, as illustrated by decisional step 618. When the speaker changes, MMCU 302 will make appropriate changes to record which client process is actually speaking. The steps of receiving an active audio stream from the new speaker, modifying the RTP packet header information, as necessary, and duplicating the packet data for transmission to the other client processes in the meeting is the same as described with reference to steps 614 and 616. The process occurs in a similar manner for video data as well as audio data. As explained previously, the video stream tracks the primary speaker generating the audio stream.

This process continues with the server 300 switching among client processes until the meeting is terminated, as indicated by decisional step 620. At which point, the MMCU returns to process step 601 where it continues to monitor the meeting conference database for meeting occurrences, otherwise the task ends, as indicated by decisional step 622.

The process described above with reference to steps 600-622 is substantially similar for full duplex and multipoint audio conferences. For conferences utilizing the "Push to Talk" mode, the process step 612 previously described is replaced with one or more procedural steps in which the MMCU 302 receives requests from client processes wishing to speak, places these requests in a queue 318, actively streams only the audio data from the client process currently having the "microphone" and thereafter monitors the active audio stream for an indication of release of the microphone. Thereafter, the next client process in the queue becomes the active streaming participant. The remaining decisional and procedural steps within the flow chart remain essentially unchanged.

Figure 7:
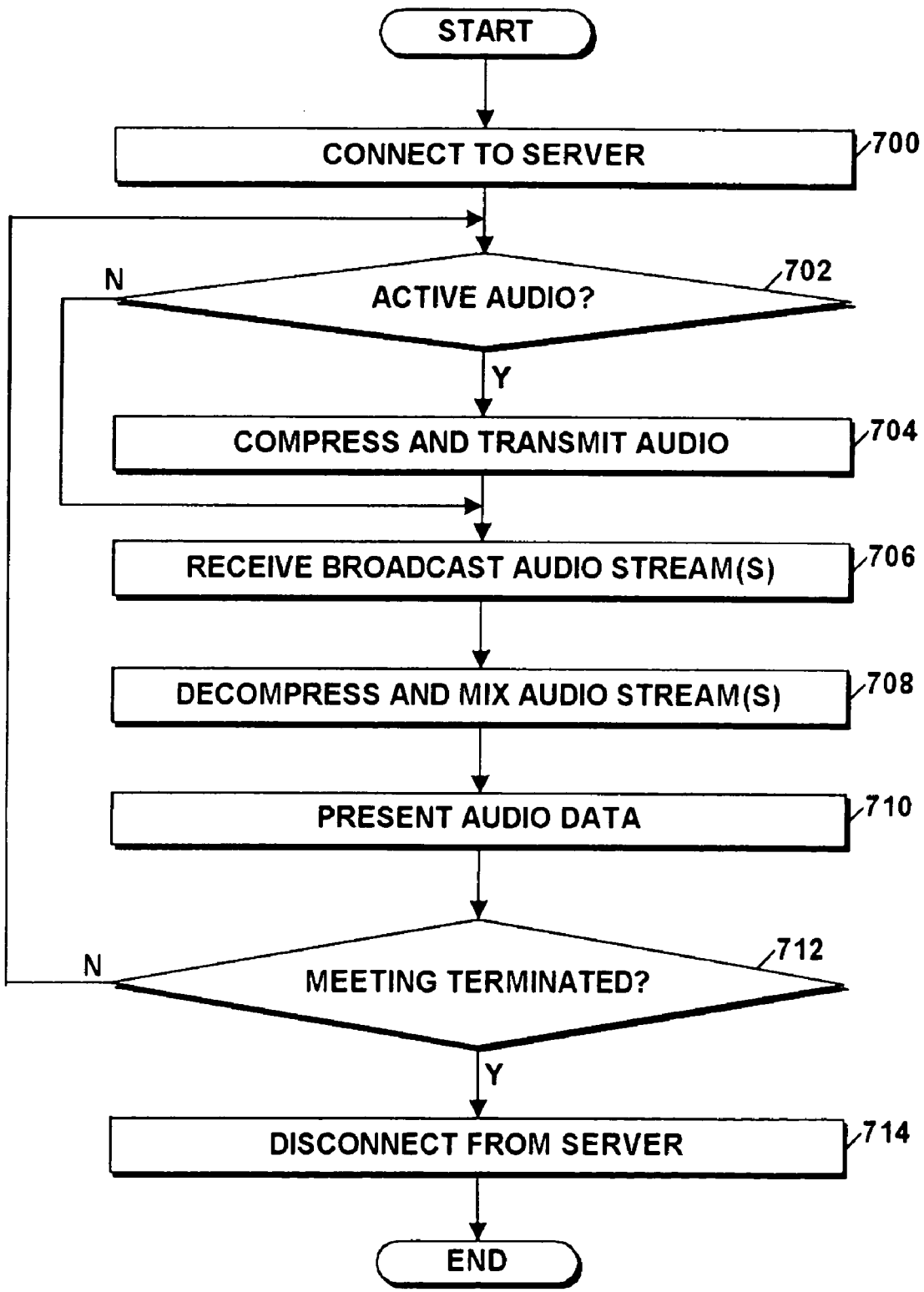
FIG. 7 illustrates the process steps performed by a client process in a multipoint or full duplex mode in accordance with the present invention.

Referring to FIG. 7, a flow chart of the process steps performed by Sametime MRC client 312 during a multipoint meeting is illustrated. First, the MRC client 312 either initiates an instant meeting through the Sametime client connect 310 or joins an existing or scheduled meeting by connecting with server 300, both illustrated by procedural step 700. Next, if the MRC client 312 desires to speak during the meeting, the client will begin to compress and transmit an active audio and/or video stream to server 300, as illustrated by decisional step 702 and procedural step 704. As stated previously, if the MRC client 312 is not one of the processes whose source data streams are being broadcast by server 300, the data streams will be ignored. Also, the client will receive one or more active data streams from server 300, as illustrated by procedural step 706. The client process, using its audio engine will decompress and, as necessary, mix multiple audio packet streams into a single signal, as illustrated by procedural step 708. Thereafter, utilizing local hardware, the client process will present the audio stream to the participant, as illustrated by procedural step 710. A similar process occurs for video data streams, except that only one video data stream is received. Accordingly there is no mixing required for the video data prior to presentation. If the meeting has terminated, the client process will disconnect from server 300, as illustrated by decisional step 712 and procedural step 714, otherwise, the task returns to monitoring for active audio streams.

Push to Talk

According to another aspect of the invention, the Sametime server 300, particularly the MMCU, enables Push to Talk audio mode meetings in which access to the microphone is controlled. In this mode, client processes participating in a meeting are required to "request the microphone" in order to actively stream audio data. The request mic functionality is implemented with a multistate button on the graphic user interface of the MRC client. By manipulating the button the client indicates to the Sametime server that it wishes to be placed into a queue 318, e.g. a First In First Out queue, maintained by the MMCU 302, to receive the microphone. Once the client receives the microphone, the client will "hold the microphone" until it designates, via the button, it is finished. Requests for the microphone and indication of release of the microphone are sent to the Sametime server with specific packets. H.323 clients cannot request the microphone. It is further contemplated, in this mode, that a moderator or system administrator may revoke the microphone from a participating client process, as necessary, for example, talking too long. The implementation of a First In and First Out queue as well as monitoring and maintenance of the queue by the MMCU 302 is within the scope of those skilled in the art and will not be described in greater detail hereinafter for the sake of brevity.

Figure 8:
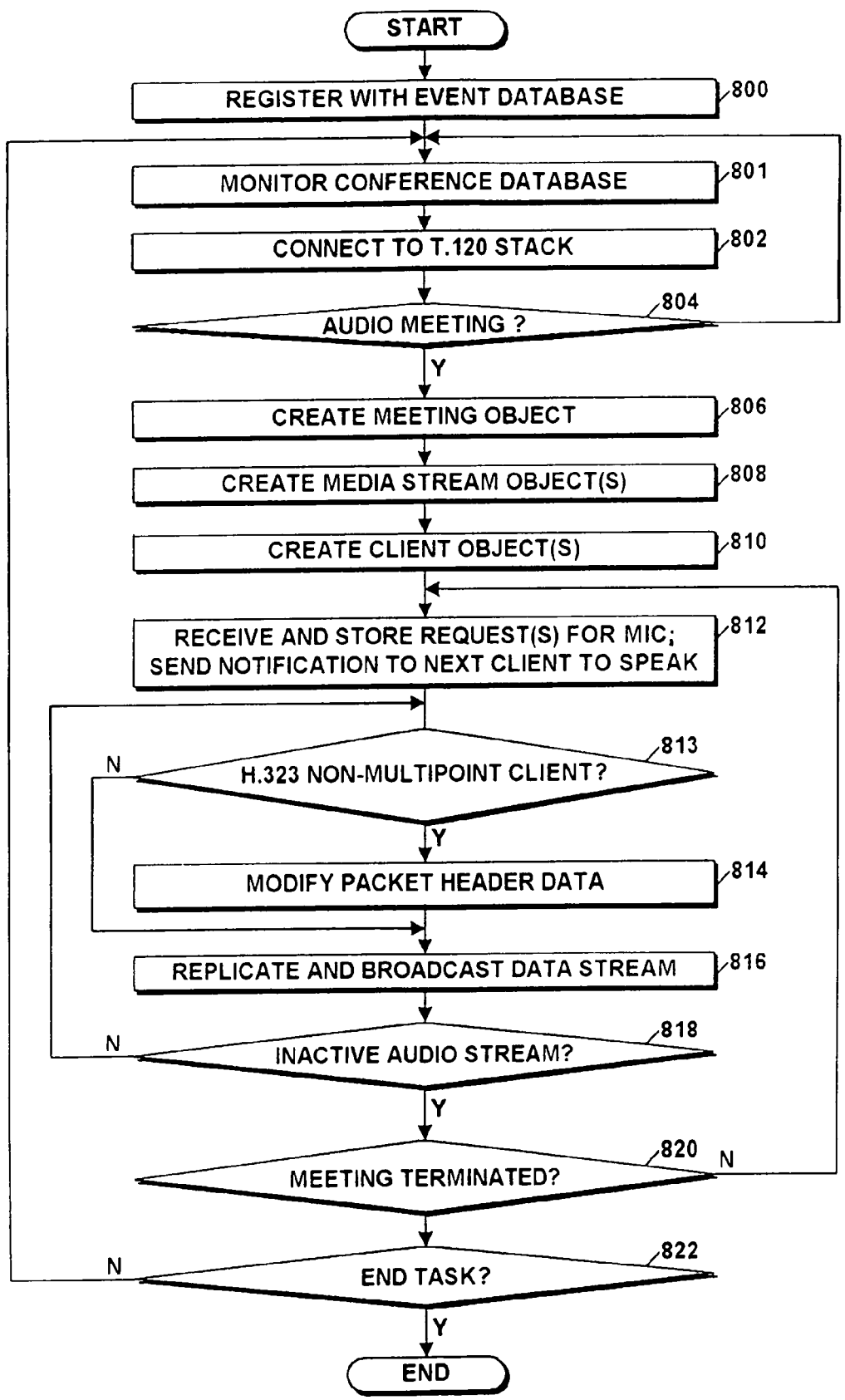
FIG. 8 illustrates the process steps performed by the multimedia conference server in a push to talk mode in accordance with the present invention.

Referring to FIG. 8, a flow chart of the process steps performed by Sametime server 300 during a Push to Talk meeting is illustrated. Essentially, steps 800-810 are similar to steps 600-610 of FIG. 6, respectively. In the Push to Talk mode server 300 receives request packets from one or more client processes wishing to speak, stores identifiers associated with these requests/client processes in a queue, and notifies the next client process to speak by transmitting a notification packet that it may begin sourcing audio and/or video, all as illustrated in step 812. Upon initiation of the meeting or if no other requests are pending in the queue, the next requestor will become the designated speaker, otherwise the next requestor in the queue will be notified. Thereafter the steps 813-822 performed by server 300 are similar to steps 613-622 of FIG. 6, respectively.

Figure 9:
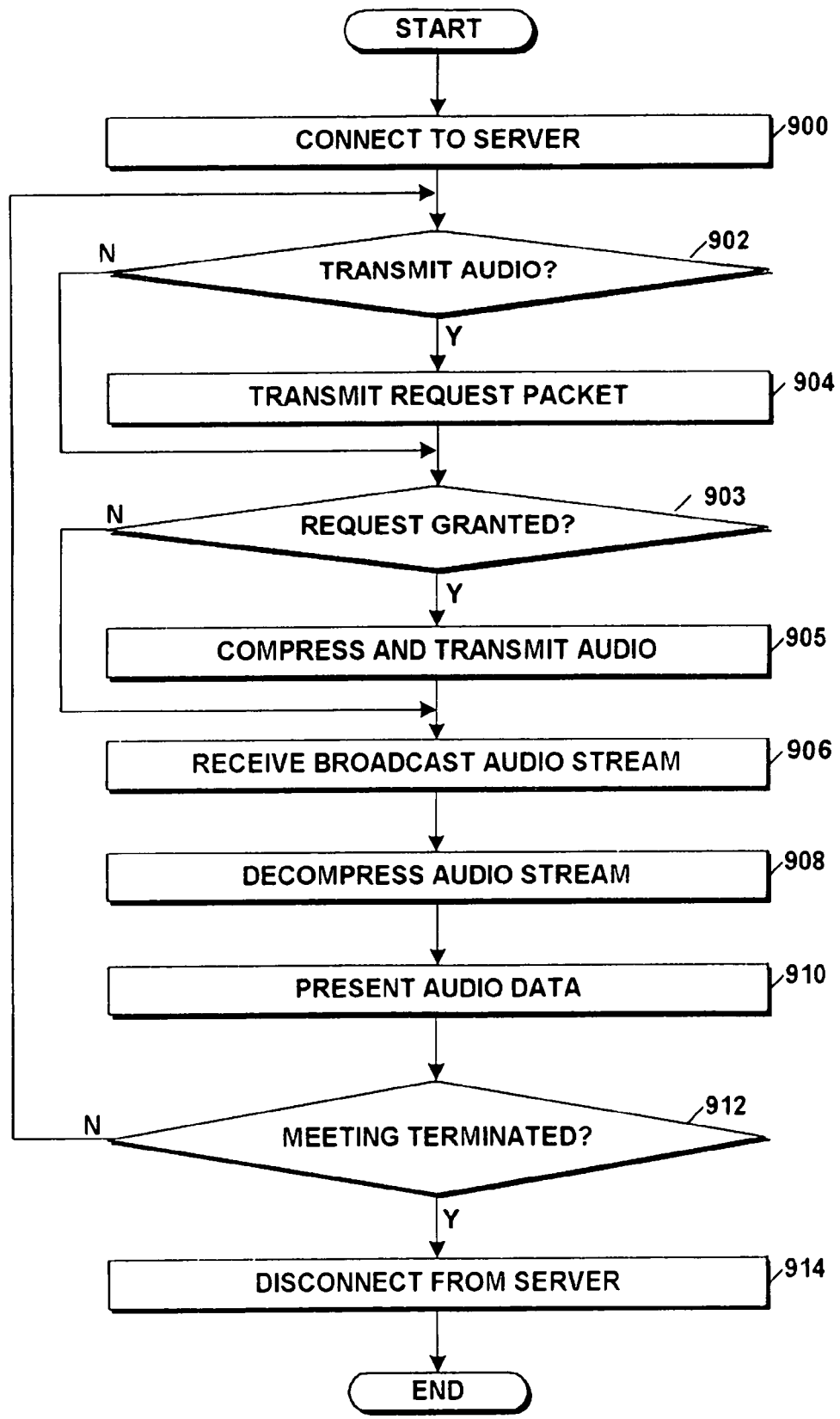
FIG. 9 illustrates the process steps performed by a client process in a push to talk mode in accordance with the present invention.

Referring to FIG. 9, a flow chart of the process steps performed by Sametime MRC client 312 during a Push to Talk meeting is illustrated. First, the MRC client 312 either initiates an instant meeting through the Sametime client connect 310 or joins an existing or scheduled meeting by connecting with server 300, both illustrated by procedural step 900. Next, if the MRC client 312 desires to speak during the meeting, the client transmits a request packet to server 300, as illustrated by decisional step 902 and procedural step 904. If the request to speak is granted, the MRC client will begin to compress and transmit an active audio and/or video stream to server 300, as illustrated by decisional step 903 and procedural step 905. If the client does not wish to speak, or the request to speak is not immediately granted, the client will receive one active data stream from server 300, as illustrated by procedural step 906. The client process, using its audio engine, will decompress the received audio stream, as illustrated by procedural step 908. Thereafter, utilizing local hardware, the client process will present the audio stream to the user, as illustrated by procedural step 910. A similar process occurs for the video data stream, if any. If the meeting has terminated the client process will disconnect from server 300, as illustrated by decisional step 912 and procedural step 914, otherwise, the task will continue.

It will be obvious to those reasonably skilled in the arts that certain process steps shown in the flow charts described herein may be programmed to occurs in a simultaneous or multitasking manner without departing from the spirit and scope of the invention.

Because the invention may be implemented as a Multimedia extension to Sametime the security policies and procedures that are part of Sametime apply to Sametime Audio and Video meetings. This includes data encryption, authentication and password protected meetings. If desired, Sametime Multimedia services can encrypt the audio and video data before transmission. This will ensure that only the intended meeting participants can see and hear the video and audio from the meeting. It should be noted that encrypting the media streams will introduce a very small amount of latency between the speaker and listeners.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein have been described using products from Lotus Development Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A system embedded in a computer-readable storage medium, when executed by one or more processors, for conferencing over a computer network, the system comprising:

a plurality of client processes operatively coupled to the computer network and configured to establish a point-to-point communication connection with an other process operatively coupled to the computer network, each of the plurality of client processes configured to receive first and second active streams of audio data, first and second client processes of the plurality of client processes are configured to transmit the first and second active streams of audio data; and a server process operatively coupled to the computer network and configured to identify the first client process of the plurality of client processes which is transmitting the first active audio stream from a first single audio source and to retransmit the first active audio stream of the first identified client process to others of the plurality of client processes in unmixed form, the server process further configured to identify the second client process of the plurality of client processes which is transmitting the second active audio stream from a second single audio source and to simultaneously retransmit the first and second active audio streams of the first and second audio sources associated with the identified first and second client processes, respectively, to the others of the plurality of client processes in unmixed form, wherein the first and second active audio streams comprise a plurality of audio data packets, each of the audio data packets havinq a packet header includinq a source identifier and sequence number associated with each of the audio data packets, and wherein the server process is further configured to modify the source identifier and sequence number of each of the packet headers in the first and second active streams of audio packets, wherein the plurality of client processes do not support multipoint conferences.

2. The system of claim 1 wherein the plurality of client processes are configured to receive the first and second active audio streams in unmixed form from the server process and to mix the first and second active audio streams into a form suitable for presentation.

3. The system of claim 1 wherein each packet header further includes a time stamp and wherein the server process is further configured to modify the time stamp of the packet headers in the active stream of audio packets.

4. The system of claim 3 wherein the server process is further configured to retransmit the modified packets of the first and second active streams of audio packets to the others of the plurality of client processes.

5. The system of claim 1 wherein one of the plurality of client processes are configured to transmit an active stream of video data.

6. The system of claim 5 wherein the server process is further configured to identify the one of the plurality of client processes which is transmitting the active video stream and to retransmit the active video stream of the one identified client process to the others of the plurality of client processes.

7. In a server process operatively coupled over a computer network to a plurality of client processes configured to establish a point-to-point communication connection with an other process operatively coupled to the computer network, each of the plurality of client processes configured to receive at least one active stream of audio data, a first and second client processes of the plurality of client processes are configured to transmit a first and second active streams of audio data, a method for conferencing over the computer network comprising:

identifying the first client process the plurality of client processes which is transmitting the first active audio stream from a first single audio source;

retransmitting the first active audio stream of the first identified client process to others of the plurality of client processes in unmixed form, identifying the second client process of the plurality of client processes which is transmitting the second active audio stream from a second single audio source, and retransmitting the first and second active audio streams of the first and second audio sources associated with the identified first and second client processes, respectively, to the others of the plurality of client processes in unmixed form, wherein the first and second active audio streams comprise a plurality of data packets, each of the data packets having a packet header including a source identifier and sequence number associated with the each of the packets, and wherein the server process is further configured to modify the source identifier and sequence number of each of the packet headers in the first and second active streams of audio packets when the plurality of client processes do not support multipoint conferences.

8. The method of claim 7 wherein the others of plurality of client processes are configured to receive the first and second active audio streams in unmixed form from the server process and to mix the first and second active audio streams into a form suitable for presentation.

9. The method of claim 7 wherein the packet header further includes a time stamp, and further comprising:
modifying the time stamp, of the packet headers in the first and second active stream of audio packets.

10. The method of claim 9 further comprising:
retransmitting the modified packets of the first and second active streams of audio packets to the others of the plurality of client processes.

11. The method of claim 7 wherein one of the plurality of client processes are configured to transmit an active stream of video data.

12. The method of claim 11 further comprising:
identify the one of the plurality of client processes which is transmitting the active video stream.

13. The method of claim 12 further comprising:
transmitting the active video stream of the one identified client process to others of the plurality of client processes.

* * * * *